United States Patent
Takebe et al.

(10) Patent No.: US 10,787,549 B2
(45) Date of Patent: Sep. 29, 2020

(54) STRUCTURE MATERIAL

(71) Applicant: TORAY INDUSTRIES, INC., Tokyo (JP)

(72) Inventors: Yoshiki Takebe, Ehime (JP); Masato Honma, Ehime (JP)

(73) Assignee: TORAY INDUSTRIES, INC., Tokyo (JP)

( * ) Notice: Subject to any disclaimer, the term of this patent is extended or adjusted under 35 U.S.C. 154(b) by 183 days.

(21) Appl. No.: 16/064,963

(22) PCT Filed: Dec. 9, 2016

(86) PCT No.: PCT/JP2016/086747
§ 371 (c)(1),
(2) Date: Jun. 21, 2018

(87) PCT Pub. No.: WO2017/110528
PCT Pub. Date: Jun. 29, 2017

(65) Prior Publication Data
US 2019/0002655 A1  Jan. 3, 2019

(30) Foreign Application Priority Data

Dec. 25, 2015  (JP) ................................. 2015-255381
Dec. 25, 2015  (JP) ................................. 2015-255383

(51) Int. Cl.
| | | |
|---|---|---|
| *C08J 5/04* | (2006.01) | |
| *C08K 7/02* | (2006.01) | |
| *B29C 70/50* | (2006.01) | |
| *C08K 7/06* | (2006.01) | |
| *C08L 101/00* | (2006.01) | |
| *B29C 43/52* | (2006.01) | |
| *B29K 307/04* | (2006.01) | |
| *B29K 105/08* | (2006.01) | |
| *B29C 43/14* | (2006.01) | |
| *B29K 69/00* | (2006.01) | |
| *B29K 63/00* | (2006.01) | |
| *B29K 23/00* | (2006.01) | |
| *B29K 77/00* | (2006.01) | |
| *B29K 81/00* | (2006.01) | |
| *B29C 43/02* | (2006.01) | |

(52) U.S. Cl.
CPC ............. *C08J 5/042* (2013.01); *B29C 70/502* (2013.01); *C08J 5/04* (2013.01); *C08K 7/06* (2013.01); *C08L 101/00* (2013.01); *B29C 43/02* (2013.01); *B29C 43/14* (2013.01); *B29C 43/52* (2013.01); *B29K 2023/12* (2013.01); *B29K 2063/00* (2013.01); *B29K 2069/00* (2013.01); *B29K 2077/00* (2013.01); *B29K 2081/04* (2013.01); *B29K 2105/0854* (2013.01); *B29K 2307/04* (2013.01); *C08J 2323/12* (2013.01); *C08J 2363/00* (2013.01); *C08J 2369/00* (2013.01); *C08J 2377/00* (2013.01); *C08J 2381/04* (2013.01)

(58) Field of Classification Search
CPC ......................................................... C08J 5/042
See application file for complete search history.

(56) References Cited

U.S. PATENT DOCUMENTS

| | | |
|---|---|---|
| 2009/0117366 A1 | 5/2009 | Honma |
| 2014/0030491 A1 | 1/2014 | Sakai et al. |
| 2014/0356612 A1 | 12/2014 | Sano et al. |
| 2016/0214346 A1 | 7/2016 | Hatanaka et al. |
| 2016/0303824 A1 | 10/2016 | Takebe et al. |
| 2019/0002654 A1* | 1/2019 | Shinohara .................. C08J 5/04 |

FOREIGN PATENT DOCUMENTS

| | | |
|---|---|---|
| JP | 6-320655 A | 11/1994 |
| JP | 7-156172 A | 6/1995 |
| JP | 2006-2294 A | 1/2006 |
| JP | 2012-890 A | 1/2012 |
| JP | 2014-508055 A | 4/2014 |
| JP | 2015-30755 A | 2/2015 |
| JP | 2015-39842 A | 3/2015 |
| JP | 2015-85613 A | 5/2015 |
| WO | WO 2014/162873 A1 | 10/2014 |
| WO | WO 2015/029634 A1 | 3/2015 |

OTHER PUBLICATIONS

Extended European Search Report for European Application No. 16878420.5, dated Jul. 19, 2019.
International Search Report, issued in PCT/JP2016/086747, PCT/ISA/210, dated Jan. 17, 2017.
Written Opinion of the International Searching Authority, issued in PCT/JP2016/086747, PCT/ISA/237, dated Jan. 17, 2017.

* cited by examiner

*Primary Examiner* — Vickey Nerangis
(74) *Attorney, Agent, or Firm* — Birch, Stewart, Kolasch & Birch, LLP

(57) ABSTRACT

A structure material includes a resin, reinforced fibers, and voids. The structure material includes a volume content of the resin being within a range of 2.5% by volume or more and 85% by volume or less, a volume content of the reinforced fibers being within a range of 0.5% by volume or more and 55% by volume or less, the voids being contained in the structure material in a rate within a range of 10% by volume or more and 97% by volume or less, a thickness St of the structure material satisfying a conditional expression: $St \geq Lf^2 \cdot (1-\cos(\theta f))$, and a specific bending modulus of the structure material represented as $Ec^{1/3} \cdot \rho^{-1}$ being within a range of 3 or more and 20 or less, and a bending modulus Ec of the structure material being 3 GPa or more.

14 Claims, 3 Drawing Sheets

STRUCTURE MATERIAL

FIELD

The present invention relates to a structure material including a resin, reinforced fibers, and voids.

BACKGROUND

In recent years, market demands for improvement in stiffness and lightness are increasing year by year for industrial products such as automobiles, aircraft, and sporting products. To meet these demands, fiber-reinforced plastics excellent in stiffness and lightness are widely used for various kinds of industrial applications. Specifically, to satisfy lightness, use of core materials having lightness is widely studied (refer to Patent Literature 1 and Patent Literature 2). However, core materials are significantly poor in stiffness as a single material. For this reason, use of a core material requires product design such as arrangement of a skin layer having high stiffness on the outer periphery of the core material. However, products designed in that way inevitably increase in mass or increase in thickness. In other words, even if resultant product weight reduction is achieved, its contribution is significantly restricted. Meanwhile, structure materials having voids have characteristics such as thermal insulation, sound insulation, and energy absorption apart from lightness and are thus also widely used for various kinds of industrial applications (Patent Literature 3 and Patent Literature 4). However, structure materials having voids are also inferior to other structure materials in stiffness as is the case with core materials and are thus restricted in their sole use as structure materials. From the foregoing circumstances, a pressing need is to provide a structure material excellent in stiffness and lightness.

In recent years, market demands for improvement in lightness are increasing year by year for industrial products such as automobiles, aircraft, and sporting products. To meet these demands, fiber-reinforced plastics that are light and excellent in mechanical characteristics are widely used for various kinds of industrial applications. Specifically, to satisfy lightness, use of core materials having voids is widely studied (refer to Patent Literature 1). However, core materials having voids are significantly poor in desired mechanical characteristics. For this reason, use of a core material having voids requires product design such as arrangement of a skin layer having high stiffness on the outer periphery of the core material in order to compensate for the inadequate characteristics. However, products designed in that way inevitably increase in weight. In other words, even if resultant product weight reduction is achieved, its contribution is significantly restricted. Meanwhile, structure materials having voids and/or density difference have characteristics such as thermal insulation, sound insulation, and energy absorption apart from lightness and are thus also widely used for various kinds of industrial applications (Patent Literature 5 and Patent Literature 6). However, structure materials having voids and/or density difference are also inferior to other structure members in mechanical characteristics as is the case with core materials and have been thus restricted in their sole use as structure materials. From the foregoing circumstances, a pressing need is to provide a structure material excellent in lightness and mechanical characteristics.

CITATION LIST

Patent Literature

Patent Literature 1: WO 2014/162873
Patent Literature 2: WO 2015/029634
Patent Literature 3: Japanese Patent Application Laid-open No. 2015-39842
Patent Literature 4: Japanese Patent Application Laid-open No. 2015-30755
Patent Literature 5: Translation of PCT Application No. 2014-508055
Patent Literature 6: Japanese Patent Application Laid-open No. H06-320655

SUMMARY

Technical Problem

The present invention has been made in view of the above problems, and an object thereof is to provide a structure material excellent in stiffness and lightness.

Another object of the present invention is to provide a structure material excellent in lightness and mechanical characteristics.

Solution to Problem

A structure material according to a first mode of the present invention includes a resin, reinforced fibers, and voids. The structure material includes a volume content of the resin being within a range of 2.5% by volume or more and 85% by volume or less, a volume content of the reinforced fibers being within a range of 0.5% by volume or more and 55% by volume or less, the voids being contained in the structure material in a rate within a range of 10% by volume or more and 97% by volume or less, a thickness St of the structure material satisfying a conditional expression: $St \geq Lf^2 \cdot (1-\cos(\theta f))$ where a length of the reinforced fibers is Lf and an oriented angle of the reinforced fibers in a sectional direction of the structure material is $\theta f$, and a specific bending modulus of the structure material represented as $Ec^{1/3} \cdot \rho^{-1}$ being within a range of 3 or more and 20 or less where a bending modulus of the structure material is Ec and a specific gravity of the structure material is $\rho$, and the bending modulus Ec of the structure material being 3 GPa or more.

A structure material according to a second mode of the present invention includes a resin, reinforced fibers, and voids. The structure material includes a volume content of the resin being within a range of 2.5% by volume or more and 85% by volume or less, a volume content of the reinforced fibers being within a range of 0.5% by volume or more and 55% by volume or less, the voids being contained in the structure material in a rate within a range of 10% by volume or more and 97% by volume or less, a thickness St of the structure material satisfying a conditional expression: $St \geq Lf^2 \cdot (1-\cos(\theta f))$ where a length of the reinforced fibers is Lf and an oriented angle of the reinforced fibers in a sectional direction of the structure material is $\theta f$, a specific bending modulus of a first part of the structure material represented as $Ec^{1/3} \cdot \rho^{-1}$ being within a range of 1 or more and less than 3 where a bending modulus of the structure material is Ec and a specific gravity of the structure material is $\rho$, and a specific bending modulus of a second part of the structure material different from the first part being within a range of 3 or more and 20 or less.

In the structure material according to the first mode of the present invention, the bending modulus Ec of the structure material is 6 GPa or more.

In the structure material according to the second mode of the present invention, the bending modulus Ec of the second part of the structure material is 6 GPa or more.

In the structure material according to the second mode of the present invention, the first part and the second part of the structure material are present at different positions in a thickness direction of the structure material.

In the structure material according to the second mode of the present invention, the first part and the second part of the structure material are present at different positions in a planar direction of the structure material.

In the structure material according to the first and second modes of the present invention, a specific gravity $\rho$ of the structure material is 0.9 g/cm$^3$ or less.

In the structure material according to the first and second modes of the present invention, a porosity of parts within 30% to a midpoint position in a thickness direction from surfaces of the structure material is within a range of 0% by volume or more and less than 10% by volume, and a porosity of a residual part is within a range of 10% by volume or more and 97% by volume or less.

In the structure material according to the first and second modes of the present invention, the reinforced fibers are coated with the resin, and a thickness of the resin is within a range of 1 μm or more and 15 μm or less.

In the structure material according to the first and second modes of the present invention, the reinforced fibers are discontinuous and are dispersed in a nearly monofilament form and in a random manner.

In the structure material according to the first and second modes of the present invention, an oriented angle θf of the reinforced fibers in the structure material is 3° or more.

In the structure material according to the first and second modes of the present invention, a longer of the mass mean fiber length of the reinforced fibers is within a range of 1 mm or more and 15 mm or less.

In the structure material according to the first and second modes of the present invention, the reinforced fibers are carbon fibers.

In the structure material according to the first and second modes of the present invention, the resin contains at least one thermoplastic resin.

In the structure material according to the first and second modes of the present invention, the resin contains at least one thermosetting resin.

Advantageous Effects of Invention

The structure material according to the present invention can provide a structure material excellent in stiffness and lightness. In addition, the structure material according to the present invention can provide a structure material excellent in lightness and mechanical characteristics.

DESCRIPTION OF EMBODIMENTS

The following describes a structure material according to first and second modes of the present invention.

[First Mode]

First, the following describes the structure material according to the first mode of the present invention.

Figure 1:
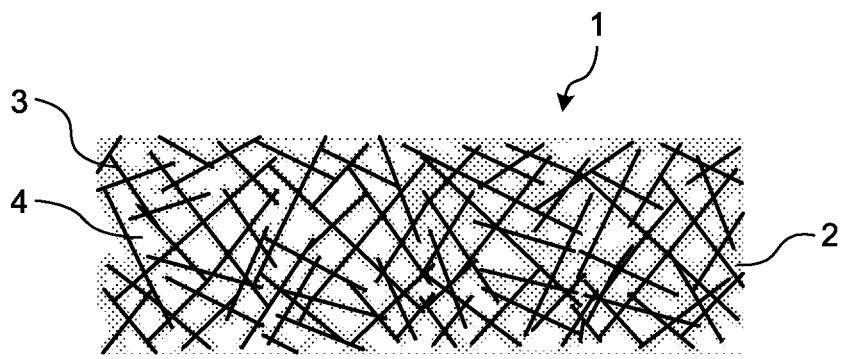
FIG. 1 is a schematic diagram of a sectional structure of a structure material according to first and second modes of the present invention.

FIG. 1 is a schematic diagram of a sectional structure of the structure material according to the first and second modes of the present invention. As illustrated in FIG. 1, this structure material 1 according to the first mode of the present invention includes a resin 2, reinforced fibers 3, and voids 4.

Examples of the resin 2 include thermoplastic resins and thermosetting resins. In the present invention, a thermosetting resin and a thermoplastic resin may be blended with each other; in that case, a component with an amount exceeding 50% by mass of the components contained in the resin is the name of the resin.

In one mode of the present invention, the resin 2 desirably contains at least one thermoplastic resin. Examples of the thermoplastic resin include thermoplastic resins selected from crystalline plastics such as "polyesters such as polyethylene terephthalate (PET), polybutylene terephthalate (PBT), polytrimethylene terephthalate (PTT), polyethylene naphthalate (PEN), and liquid crystal polyesters; polyolefins such as polyethylene (PE), polypropylene (PP), and polybutylene; polyoxymethylene (POM), polyamide (PA), and polyarylene sulfides such as polyphenylene sulfide (PPS); polyketone (PK), polyether ketone (PEK), polyether ether ketone (PEEK), polyether ketone ketone (PEKK), polyether nitrile (PEN), and fluorine-based resins such as polytetrafluoroethylene; and liquid crystal polymers (LCP)", amorphous plastics such as "styrene-based resins, polycarbonate (PC), polymethyl methacrylate (PMMA), polyvinyl chloride (PVC), polyphenylene ether (PPE), polyimide (PI), polyamideimide (PAI), polyetherimide (PEI), polysulfone (PSU), polyether sulfone, and polyarylate (PAR)", phenol-based resins, phenoxy resins, polystyrene-based, polyolefin-based, polyurethane-based, polyester-based, polyamide-based, polybutadiene-based, polyisoprene-based, and fluorine-based resins, acrylonitrile-based and other thermoplastic elastomers, and copolymers and modifieds of these. Among them, polyolefin is desirably used in view of the lightness of an obtained structure material, polyamide is desirably used in view of the strength thereof, amorphous plastics such as polycarbonate and styrene-based resins are desirably used in view of the surface appearance thereof, polyarylene sulfides are desirably used in view of heat resistance, polyether ether ketone is desirably used in view of the continuous use temperature thereof, and fluorine-based resins are desirably used in view of the chemical resistance thereof.

In one mode of the present invention, the resin 2 desirably contains at least one thermosetting resin. Examples of the thermosetting resin include unsaturated polyesters, vinyl esters, epoxy resins, phenol resins, urea resins, melamine resins, thermosetting polyimides, copolymers and modifieds of these, and resins obtained by blending at least two of these. The structure material according to the present invention may contain impact-resistant improvers such as elastomer and rubber components and other fillers and additives to the extent that the objects of the present invention are not impaired. Examples of fillers and additives include inorganic fillers, fire retardants, conductivity imparting agents, nucleators, ultraviolet absorbers, antioxidants, damping materials, antibacterial agents, insect repellents, deodorants, anti-coloring agents, thermal stabilizers, mold release agents, antistatic agents, plasticizers, lubricants, colorants, pigments, dyes, foaming agents, anti-foaming agents, and coupling agents.

The volume content of the resin 2 is within a range of 2.5% by volume or more and 85% by volume or less. When the volume content of the resin 2 is less than 2.5% by volume, it is unable to bind the reinforced fibers 3 within the structure material 1 together to make the reinforcing effect of the reinforced fibers 3 sufficient and to satisfy the mechanical characteristics especially bending properties of the structure material, which is thus undesirable. In contrast, when the volume content of the resin 2 is larger than 85% by volume, the resin amount is too large, and it is difficult to have a void structure, which is thus undesirable.

Examples of the reinforced fibers 3 include metallic fibers formed of aluminum, brass, stainless, and the like, polyacrylonitrile (PAN)-based, rayon-based, lignin-based, and pitch-based carbon fibers, graphite fibers, insulating fibers formed of glass and the like, organic fibers formed of aramid, phenylenebenzobisoxazole (PBO), polyphenylene sulfide, polyester, acrylic, nylon, polyethylene, and the like, and inorganic fibers formed of silicon carbide, silicon nitride, and the like. Surface treatment may be applied to these fibers. Examples of the surface treatment include coating treatment with metal as a conductor, treatment with coupling agents, treatment with sizing agents, treatment with binders, and adhesion treatment for additives. One of these fibers may be used alone, or two or more of them may be used in combination. Among them, PAN-based, pitch-based, and rayon-based carbon fibers, which are excellent in specific strength and specific stiffness, are desirably used in view of a weight reduction effect. Glass fibers are desirably used in view of increasing the economy of the obtained structure material; carbon fibers and glass fibers are desirably used in combination in view of a balance between mechanical characteristics and economy in particular. Furthermore, aramid fibers are desirably used in view of increasing the impact absorption and shaping property of the obtained structure material; carbon fibers and aramid fibers are desirably used in combination in view of a balance between mechanical characteristics and impact absorption in particular. Reinforced fibers coated with metal such as nickel, copper, or ytterbium can also be used in view of increasing the conductivity of the obtained structure material. Among them, PAN-based carbon fibers, which are excellent in strength and mechanical characteristics such as modulus, are more desirably used.

The reinforced fibers 3 are desirably discontinuous and dispersed in a nearly monofilament form and in a random manner. The reinforced fibers 3 are prepared in such a manner, whereby when a sheet-shaped structure precursor or structure material is molded by applying external force, shaping into a complex shape is made easy. In addition, the reinforced fibers 3 are prepared in such a manner, whereby voids formed by the reinforced fibers 3 become fine, and weak parts at fiber bundle ends of the reinforced fibers 3 in the structure material 1 can be minimized, and thus giving isotropy in addition to excellent reinforcing efficiency and reliability. The nearly monofilament indicates that a reinforced fiber single yarn is present as less than 500 fine-denier strands. The reinforced fibers 3 are more desirably dispersed in a monofilament form.

Being dispersed in a nearly monofilament form or monofilament form indicates that, for a reinforced fiber 3 freely selected in the structure material 1, the rate of single filaments having a two-dimensional contact angle of 1° or more (hereinafter, also referred to as a fibers dispersed rate) is 80% or more or, in other words, that a bundle in which two or more single filaments in the structure material 1 are in contact with each other to be parallel to each other is less than 20%. Consequently, the mass fraction of a fiber bundle with a filament number of 100 or less at least in the reinforced fibers 3 particularly preferably corresponds to 100%.

Figure 2:
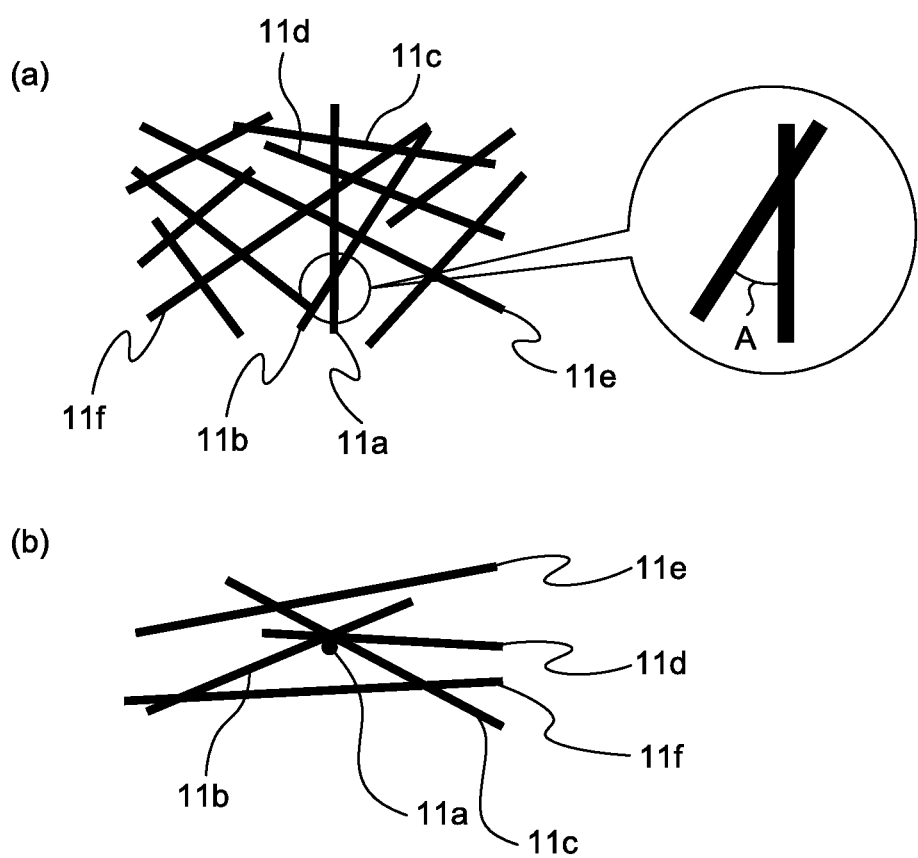
FIG. 2 is a schematic diagram of an example of a dispersion state of reinforced fibers in a fiber-reinforced mat used in the present invention.

The two-dimensional contact angle refers to an angle formed by a single filament and a single filament being in contact with this single filament in the case of discontinuous reinforced fibers and is defined as an angle on an acute angle side within a range of 0° or more and 90° or less out of angles formed by the single filaments being in contact with each other. The following further describes this two-dimensional contact angle with reference to a drawing. FIG. 2 is a schematic diagram of an example of a dispersion state of the reinforced fibers in a fiber-reinforced mat when observed in a planar direction (FIG. 2(a)) and a thickness direction (FIG. 2(b)). With reference to a single filament 11a, the single filament 11a is observed to cross single filaments 11b to 11f in FIG. 2(a), whereas the single filament 11a is not in contact with the single filaments 11e and 11f in FIG. 2(b). In this case, the single filaments 11b to 11d are objects for which the two-dimensional contact angle is evaluated for the single filament 11a as the reference; the two-dimensional contact angle is an angle A on the acute angle side within a range of 0° or more and 90° or less out of the two angles formed by the two single filaments being in contact with each other.

A method for measuring the two-dimensional contact angle is not limited to a particular method; a method can be exemplified that observes the orientation of the reinforced fibers 3 from a surface of the structure material 1, for example. In this case, the surface of the structure material 1 is polished to expose the reinforced fibers 3, whereby the reinforced fibers 3 become easier to be observed. Another example that can be exemplified is a method that performs X-ray computed tomography (CT) transmission observation to take an orientation image of the reinforced fibers 3. For the reinforced fibers 3 having high X-ray transmissivity, fibers for a tracer are mixed into the reinforced fibers 3, or a chemical for a tracer is applied to the reinforced fibers 3, whereby the reinforced fibers 3 become easier to be observed, which is thus desirable. When measurement is difficult by the methods, a method can be exemplified that puts the structure material 1 into a high-temperature environment such as an oven to burn off a resin component and then observes the orientation of the reinforced fibers 3 from the reinforced fibers 3 that have been taken out using an optical microscope or an electron microscope.

The fibers dispersed rate is measured by the following procedure based on the method of observation described above. Specifically, the two-dimensional contact angle is measured for all the single filaments (the single filaments 11b to 11d in FIG. 2) being in contact with a single filament selected at random (the signal filament 11a in FIG. 2). This measurement is performed for 100 single filaments, and a rate is calculated from the ratio of the number of signal filaments having a two-dimensional contact angle of 1° or more to the total number of all the single filaments for which the two-dimensional contact angle is measured.

Furthermore, the reinforced fibers 3 are particularly desirably dispersed in a random manner. The reinforced fibers 3 being dispersed in a random manner refers to the fact that the arithmetic mean of a two-dimensional oriented angle of a reinforced fiber 3 freely selected in the structure material 1 is within a range of 30° or more and 60° or less. The two-dimensional oriented angle refers to an angle formed by a single filament of the reinforced fiber 3 and a single filament crossing this single filament and is defined as an angle on an acute angle side within a range of 0° or more and 90° or less out of angles formed by the single filaments crossing each other.

The following further describes this two-dimensional oriented angle with reference to a drawing. In FIGS. 2(*a*) and (*b*), with reference to the single filament 11*a*, the single filament 11*a* crosses the other single filaments 11*b* to 11*f*. The crossing means a state in which a single filament as a reference is observed to cross other single filaments on a two-dimensional plane observed, does not necessarily require the single filament 11*a* and the single filaments 11*b* to 11*f* to be in contact with each other, and does not exclude a state in which the single filament 11*a* is observed to cross the single filaments 11*b* to 11*f* when viewed in a projected manner. In other words, focusing on the single filament 11*a* as the reference, all the single filaments 11*b* to 11*f* are objects for which the two-dimensional oriented angle is evaluated; in FIG. 2(*a*), the two-dimensional oriented angle is the angle A on the acute angle side within a range of 0° or more and 90° or less out of the two angles formed by the two crossing single filaments.

A method for measuring the two-dimensional oriented angle is not limited to a particular method; a method can be exemplified that observes the orientation of the reinforced fibers 3 from a surface of the structure element, for example, for which means similar to the method for measuring the two-dimensional contact angle described above can be employed. The mean of the two-dimensional oriented angle is measured by the following procedure. Specifically, the mean of the two-dimensional oriented angle is measured for all the single filaments (the single filaments 11*b* to 11*f* in FIG. 2) crossing a single filament selected at random (the signal filament 11*a* in FIG. 2). When there are a large number of other single filaments crossing a single filament, for example, an arithmetic mean measured by selecting 20 other crossing single filaments at random may be substituted. This measurement is repeated a total of five times with reference to other single filaments, and its arithmetic mean is calculated as the arithmetic mean of the two-dimensional oriented angle.

The reinforced fibers 3 are dispersed in a nearly monofilament form and in a random manner, whereby the performance given by the reinforced fibers 3 dispersed in a nearly monofilament form described above can be increased to the maximum. In addition, isotropy can be imparted to the mechanical characteristics of the structure material 1. In view of the foregoing, the fibers dispersed rate of the reinforced fibers 3 is desirably 90% or more and more desirably closer to 100%. The arithmetic mean of the two-dimensional oriented angle of the reinforced fibers 3 is desirably within a range of 40° or more and 50° or less and more desirably closer to 45°, which is an ideal angle.

Examples of the reinforced fibers 3 not having a nonwoven fabric-like form include a sheet substrate, a woven fabric substrate, and a non-crimped substrate in which the reinforced fibers 3 are arranged in one direction. These forms arrange the reinforced fibers 3 regularly and densely, and thus there are few voids 4 in the structure material 1, which makes the impregnation of the resin 2 extremely difficult and may form a non-impregnated part or significantly restrict alternatives about impregnating means and/or resin type.

The form of the reinforced fibers 3 may be any of a continuous reinforced fiber having a length similar to that of the structure material 1 and a discontinuous reinforced fiber with a finite length cut into a certain length; it is desirably a discontinuous reinforced fiber in view of easily impregnating the reinforced fibers 3 with the resin 2 or being able to easily adjust the amount of the resin 2.

The volume content of the reinforced fibers 3 is within a range of 0.5% by volume or more and 55% by volume or less. When the volume content of the reinforced fibers 3 is less than 0.5% by volume, the reinforcing effect caused by the reinforced fibers 3 is unable to be sufficient, which is thus undesirable. In contrast, when the volume content of the reinforced fibers 3 is larger than 55% by volume, the volume content of the resin 2 relative to the reinforced fibers 3 is relatively low, and it is unable to bind the reinforced fibers 3 within the structure material 1 together to make the reinforcing effect of the reinforced fibers 3 sufficient and to satisfy the mechanical characteristics especially bending properties of the structure material 1, which is thus undesirable.

The reinforced fibers 3 are coated with the resin 2, in which the thickness of the resin 2 is preferably within a range of 1 μm or more and 15 μm or less. As to the coated state of the reinforced fibers 3 coated with the resin 2, coating at least intersection points of the single filaments of the reinforced fibers 3 contained in the structure material 1 is sufficient in view of the shape stability of the structure material 1 and the easiness and the degree of freedom in thickness control; as a more desirable manner, the resin 2 is desirably coated around the reinforced fibers 3 with the above thickness. This state means that the surface of the reinforced fibers 3 is not exposed owing to the resin 2 or, in other words, that the reinforced fibers 3 form an electric wire-shaped coating by the resin 2. This formation further causes the structure material 1 to have shape stability and makes its expression of mechanical characteristics sufficient. In addition, the coated state of the reinforced fibers 3 coated with the resin 2 is not required to be coated across the whole of the reinforced fibers 3 and may be within a range in which the shape stability, the bending modulus, and the bending strength of the structure material 1 according to the present invention are not impaired.

The longer of the mass mean fiber length of the reinforced fibers 3 is desirably within a range of 1 mm or more and 15 mm or less. With this length, the reinforcing efficiency of the reinforced fibers 3 can be increased, and thus excellent mechanical characteristics can be imparted to the structure material 1. When the longer of the mass mean fiber length of the reinforced fibers 3 is less than 1 mm, the voids 4 within the structure material 1 are unable to be formed efficiently, and the specific gravity may increase; in other words, it is difficult to obtain the structure material 1 with a desired thickness even with the same mass, which is thus undesirable. In contrast, when the longer of the mass mean fiber length of the reinforced fibers 3 is longer than 15 mm, the reinforced fibers 3 are likely to bend by their self-weight within the structure material 1 to cause the expression of mechanical characteristics to be hindered, which is thus undesirable. The resin component of the structure material 1 is removed by a method such as burning or eluting, 400 remaining reinforced fibers 3 are selected at random, and the lengths thereof are measured down to 10 μm; the longer of the mass mean fiber length can be calculated as the mean length thereof.

The voids 4 in the present invention each indicate a space formed by the reinforced fibers 3 coated with the resin 2 serving as columnar supports and overlapping with each other or crossing each other. When a structure precursor in which the reinforced fibers 3 are impregnated with the resin 2 in advance is heated to obtain a structure material, for example, the melting or softening of the resin 2 along with heating raises the reinforced fibers 3 to form the voids 4. This phenomenon is based on the property of the reinforced fibers 3 inside the structure precursor in a compressed state by pressurization rising by hair raising force caused by their modulus. The content of the voids 4 in the structure material 1 is within a range of 10% by volume or more and 97% by volume or less. When the content of the voids 4 is less than 10% by volume, the specific gravity of the structure material 1 is high, and lightness is not satisfied, which is thus undesirable. In contrast, when the content of the voids 4 is larger than 97% by volume or, in other words, the thickness of the resin 2 coated around the reinforced fibers 3 is small, and the reinforcing of the reinforced fibers 3 in the structure material 1 is not performed sufficiently to decrease mechanical characteristics, which is thus undesirable. The upper limit of the content of the voids 4 is desirably 97% by volume. In the present invention, as to the volume content, the sum of the respective volume contents of the resin 2, the reinforced fibers 3, and the voids 4 included in the structure material 1 is defined as 100% by volume.

A thickness St of the structure material 1 satisfies a conditional expression $St \geq Lf^2 \cdot (1-\cos(\theta f))$ where the length of the reinforced fibers 3 is Lf and the oriented angle of the reinforced fibers 3 in a sectional direction of the structure material 1 is θf. The thickness St of the structure material 1 not satisfying the conditional expression indicates that the reinforced fibers 3 in the structure material 1 are bending or that a balance between the structure material 1 with a desired thickness and a fiber length is poor. This indicates that the structure material 1 is poor in the degree of freedom in thickness design because the feature of the charged reinforced fibers 3 is unable to be sufficiently expressed, and furthermore, as to characteristics using the tensile strength and the tensile modulus of the reinforced fibers 3 among the mechanical characteristics of the structure material 1, an efficient reinforcing effect is unable to be obtained because the straightness of the reinforced fibers 3 is lost, which is thus undesirable. In the conditional expression, the value is preferably within a range of 2% or more and 20% or less of the thickness St of the structure material 1 and particularly preferably within a range of 5% or more and 18% or less thereof considering that a balance can be obtained between bending modulus and specific bending modulus as the characteristics of the structure material 1 formed by the length and the oriented angle of the reinforced fibers 3 and that owing to the fiber length and its oriented angle in the structure material 1, deformation in a state before solidification or curing during a molding process is easily performed to facilitate the molding of the desired structure material 1. The units used for the conditional expression are St [mm], Lf [mm], and θf [°].

The length Lf of the reinforced fibers 3 can be calculated as the longer of the mass mean fiber length calculated from the lengths obtained by removing the resin component of the structure material 1 by a method such as burning or eluting, selecting 400 remaining reinforced fibers 3 at random, and measuring the lengths thereof down to 10 μm. The oriented angle θf of the reinforced fibers 3 in the sectional direction of the structure material 1 is the degree of inclination relative to the sectional direction of the structure material 1 or, in other words, the degree of inclination of the reinforced fibers 3 relative to the thickness direction. A larger value indicates that the reinforced fibers 3 are inclined in an upright manner in the thickness direction, and the value is given within a range of 0° or more and 90° or less. In other words, the oriented angle θf of the reinforced fibers 3 is set to be within the range, whereby reinforcing function in the structure material 1 can be expressed more effectively. The upper limit of the oriented angle θf of the reinforced fibers 3, which is not limited to a particular value, is desirably 60° or less and more desirably 45° or less in view of the expression of bending modulus as the structure material 1. When the oriented angle θf of the reinforced fibers 3 is less than 3°, the reinforced fibers 3 in the structure material 1 are oriented in a planar manner or, in other words, a two-dimensional manner, and the degree of freedom in the thickness of the structure material 1 decreases, and lightness is unable to be satisfied, which is thus undesirable. For this reason, the oriented angle θf of the reinforced fibers 3 is preferably 3° or more.

Figure 3:
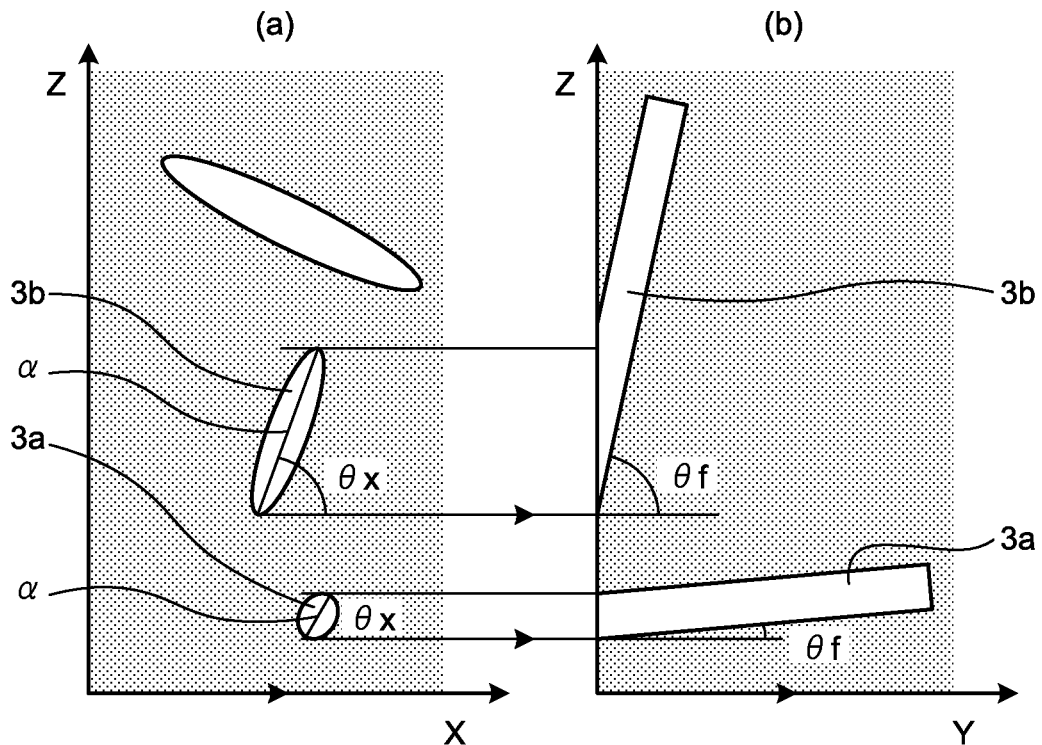
FIG. 3 is a schematic diagram of an example of sectional structures in a planar direction and a thickness direction of the structure material according to the first and second modes of the present invention.

The oriented angle θf of the reinforced fibers 3 can be measured based on observation of a perpendicular section relative to the planar direction of the structure material 1. FIG. 3 is a schematic diagram of an example of sectional structures in the planar direction (FIG. 3(a)) and the thickness direction (FIG. 3(b)) of the structure material according to the first and second modes of the present invention. In FIG. 3(a), the sections of reinforced fibers 3a and 3b are approximated to an oval shape in order to simplify measurement. In the section of the reinforced fiber 3a, its aspect ratio of the oval (=oval major axis/oval minor axis) is viewed to be smaller, whereas in the section of the reinforced fiber 3b, its aspect ratio of the oval is viewed to be larger. Meanwhile, according to FIG. 3(b), the reinforced fiber 3a has an inclination nearly parallel relative to a thickness direction Y, whereas the reinforced fiber 3b has a certain amount of inclination relative to the thickness direction Y. In this case, as to the reinforced fiber 3b, an angle θx formed by a planar direction X of the structure material 1 and a fiber principal axis (the major axial direction in the oval) α is nearly equal to an out-of-plane angle θf of the reinforced fiber 3b. In contrast, as to the reinforced fiber 3a, there is a large deviation between the angle θx and the oriented angle θf, and it cannot be said that the angle θx is reflective of the oriented angle θf. Consequently, when the oriented angle θf is read from the perpendicular section relative to the planar direction of the structure material 1, the aspect ratio of the oval of a fiber section having a certain value or more is extracted, whereby the accuracy of detecting the oriented angle θf can be increased.

For an indicator of the aspect ratio of the oval to be extracted, a method can be employed that when the sectional shape of the single filament is close to a perfect circle or, that is, when a fiber aspect ratio in a section perpendicular to the longitudinal direction of the reinforced fibers 3 is 1.1 or less, the angle θx formed by the planar direction X and the fiber principal axis α is measured for the reinforced fibers 3 having an aspect ratio of the oval of 20 or more, and this angle is employed as the oriented angle θf. In contrast, when the sectional shape of the single filament is an oval shape, a cocoon shape or the like, in which the fiber aspect ratio is larger than 1.1, it is better to focus on the reinforced fibers 3 having a larger aspect ratio of the oval to measure the oriented angle θf; the reinforced fibers 3 having an aspect ratio of the oval of 30 or more when the fiber aspect ratio is 1.1 or more and less than 1.8, having an aspect ratio of the oval of 40 or more when the fiber aspect ratio is 1.8 or more and less than 2.5, and having an aspect ratio of the oval of 50 or more when the fiber aspect ratio is 2.5 or more may be selected, and the oriented angle θf thereof may be measured.

The specific bending modulus of the structure material 1 represented as $Ec^{1/3} \cdot \rho^{-1}$ is within a range of 3 or more and 20 or less where the bending modulus of the structure material 1 is Ec and the specific gravity of the structure material 1 is ρ. When the specific bending modulus of the structure material 1 is less than 3, even if the bending modulus is high, the specific gravity is also high, and a desired weight reduction effect is unable to be obtained, which is thus undesirable. In contrast, when the specific bending modulus of the structure material 1 is larger than 20, it is indicated that the bending modulus is low, although the weight reduction effect is sufficient; it is difficult to maintain a shape desired as the structure material 1, and the bending modulus of the structure material 1 itself is poor, which is thus undesirable. The specific bending modulus of steel materials and aluminum is 1.5 or less in general; the region of the specific bending modulus extremely excellent compared with these metallic materials is achieved. Furthermore, the specific bending modulus of the structure material 1 is 3 or more exceeding 2.3, which is a general specific bending modulus of carbon fiber-reinforced plastic composite materials attracting attention for their weight reduction effect, and further desirably 5 or more.

The bending modulus Ec of the structure material 1 may be 3 GPa or more and desirably 6 GPa or more. When the bending modulus Ec of the structure material 1 is less than 3 GPa, the range of use as the structure material 1 is limited, which is thus undesirable. In addition, to facilitate the design of the structure material 1, the bending modulus desirably has isotropy. The upper limit of the bending modulus is not limited; in a structure material formed of reinforced fibers and a resin in general, a value calculated from the respective moduli of the reinforced fibers and the resin as its components can be the upper limit. In the structure material according to the present invention, both when the structure material is used alone and when it is used in combination with another member, a member is designed using the bending modulus of the structure material itself; 5 GPa is enough for practical use.

The specific gravity ρ of the structure material 1 is desirably 0.9 g/cm³ or less. When the specific gravity ρ of the structure material 1 is larger than 0.9 g/cm³, that means that mass as the structure material 1 increases, resulting in an increase in mass when being made into a product, which is thus undesirable. The lower limit of the specific gravity is not limited; in a structure material formed of reinforced fibers and a resin in general, a value calculated from the respective volume ratios of the reinforced fibers, the resin, and the voids as its components can be the lower limit. In the structure material according to the present invention, both when the structure material is used alone and when it is used in combination with another member, the specific gravity of the structure material itself is desirably 0.03 g/cm³ or more in view of maintaining the mechanical characteristics of the structure material, although it varies depending on the reinforced fibers and the resin used.

The porosity of parts within 30% to a midpoint position in the thickness direction from surfaces of the structure material 1 is desirably within a range of 0% by volume or more and less than 10% by volume, and the porosity of a residual part is desirably within a range of 10% by volume or more and 97% by volume or less. A smaller porosity gives excellence in mechanical characteristics, whereas a larger porosity gives excellence in lightness. In other words, when the structure material 1 is formed of a material of the same composition, the porosity of the parts within 30% to the midpoint position in the thickness direction from the surfaces of the structure material 1 is 0% by volume or more and less than 10% by volume, thereby ensuring the mechanical characteristics of the structure material 1, and the porosity of the residual part is within a range of 10% by volume or more and 97% by volume or less, thereby satisfying lightness, which is thus desirable.

Figure 4:
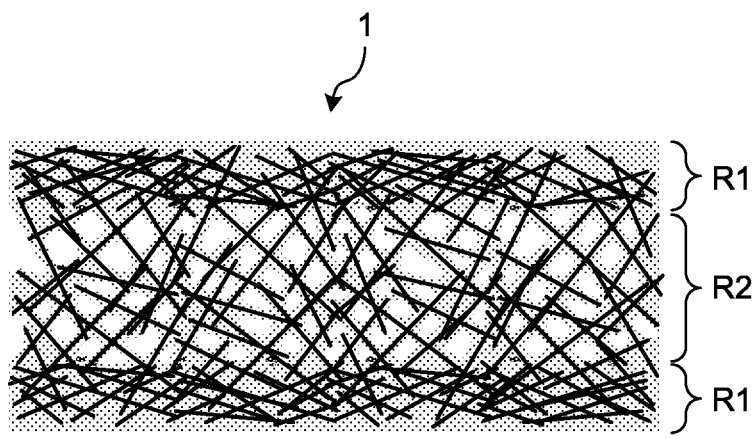
FIG. 4 is a drawing of parts within 30% to a midpoint position in a thickness direction from surfaces of the structure material and a residual part.
Figure 5:
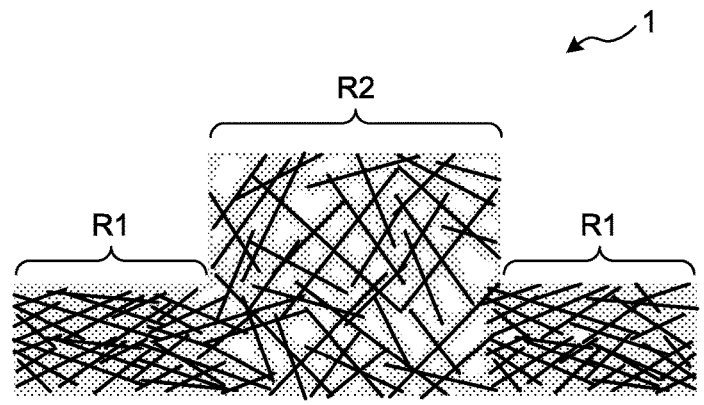
FIG. 5 is a drawing of parts within 30% to the midpoint position in the thickness direction from the surfaces of the structure material and the residual part.

The thickness of the structure material 1 in the present invention can be determined by the shortest distance connecting one point on a surface and a surface on the back thereof for which the thickness is desired to be determined. The midpoint in the thickness direction means an intermediate point in the thickness of the structure material 1. The parts within 30% to the midpoint position in the thickness direction from the surfaces of the structure material means parts containing up to 30% distance from the surfaces of the structure material 1 when the distance from the surfaces of the structure material 1 to its midpoint in the thickness direction is 100%. The residual part means a residual part after removing a part within 30% to the midpoint position in the thickness direction from one surface of the structure material 1 and a part within 30% to the midpoint position in the thickness direction from the other surface. Parts R1 within 30% to the midpoint position in the thickness direction from the surfaces of the structure material 1 and a residual part R2 may be present at different positions in the thickness direction of the structure material 1 as illustrated in FIG. 4 or present at different positions in the planar direction thereof as illustrated in FIG. 5.

The reinforced fibers 3 in the present invention desirably have a nonwoven fabric-like form in view of the easiness of the impregnation of the resin 2 into the reinforced fibers 3. Furthermore, the reinforced fibers 3 have a nonwoven fabric-like form, whereby in addition to easy handleability of the nonwoven fabric itself, impregnation can be made easy even in the case of thermoplastic resins, which are generally high in viscosity, which is thus desirable. The nonwoven fabric-like shape indicates a form in which strands and/or monofilaments of the reinforced fibers 3 are dispersed irregularly in a planar form; examples thereof include a chopped strand mat, a continuous strand mat, a paper-making mat, a carding mat, and an air-laid mat (hereinafter, referred to collectively as a fiber-reinforced mat).

Examples of a method for manufacturing the fiber-reinforced mat included in the structure material 1 include a method for manufacturing the fiber-reinforced mat by dispersing the reinforced fibers 3 in a strand and/or a nearly monofilament form in advance. Examples of the method for manufacturing the fiber-reinforced mat include a dry process such as an air-laid method that disperses the reinforced fibers 3 to form a sheet with an airflow and a carding method that shapes the reinforced fibers 3 while mechanically carding them to form a sheet and a wet process by Radright method that stirs the reinforced fibers 3 in the water to make paper as known techniques. Examples of means for making the reinforced fibers 3 closer to a monofilament form include in the dry process a method that provides fiber-opening bars, a method that vibrates fiber-opening bars, a method that makes meshes of a card finer, and a method that adjusts the rotational speed of a card. Examples thereof include in the wet process a method that adjusts the stirring condition of the reinforced fibers 3, a method that dilutes a reinforced fiber concentration of a dispersion, a method that adjusts the viscosity of a dispersion, and a method that inhibits an eddy when a dispersion is transferred. In particular, the fiber-reinforced mat is desirably manufactured by the wet process, and the concentration of charged fibers is increased or the flow rate (flow) of a dispersion and the speed of a mesh conveyor are adjusted, whereby the rate of the reinforced fibers 3 in the fiber-reinforced mat can be easily adjusted. The speed of the mesh conveyor is decreased relative to the flow rate of the dispersion, whereby the orientation of fibers in an obtained fiber-reinforced mat is difficult to be directed to a taking direction, and a bulky fiber-reinforced mat can be manufactured, for example. The fiber-reinforced mat may be formed of the reinforced fibers 3 alone. The reinforced fibers 3 may be mixed with a matrix resin component in a powdery form or a fibrous form. The reinforced fibers 3 may be mixed with organic compounds or inorganic compounds. The reinforced fibers 3 may be bonded to each other with a resin component.

Furthermore, the fiber-reinforced mat may be impregnated with the resin 2 in advance to form a structure precursor. For a method for manufacturing the structure precursor according to the present invention, a method that applies pressure to the fiber-reinforced mat with the resin 2 being in a state heated at a temperature melting or softening or more to impregnate the fiber-reinforced mat therewith is desirably used in view of the easiness of manufacture. Specifically, a method that melt-impregnates the fiber-reinforced mat with a laminate arranging the resin 2 from both sides in the thickness direction can be desirably exemplified.

For equipment for implementing the methods, a compression molding machine or a double belt press can be suitably used. The former is for a batch type; an intermittent type press system arranging two or more machines for heating and cooling in a row can improve productivity. The latter is for a continuous type, which can easily perform continuous processing and is thus excellent in continuous productivity.

In manufacturing the structure material 1 according to the present invention, a method that manufactures it by at least the following processes [1] and [2] is preferably employed in view of the easiness of manufacture.

Process [1]: a process for applying pressure with the resin 2 heated at a temperature melting or softening or more and impregnating the fiber-reinforced mat with the resin 2 to prepare a structure precursor Process [2]: a process for performing thickness adjustment with the structure precursor heated to swell it Process [2] is a process for performing thickness adjustment with the structure precursor obtained at Process [1] heated to swell it. The temperature heated in this process preferably gives an amount of heat sufficient for melting or softening the resin 2 when the resin 2 included in the structure material 1 is a thermoplastic resin in view of the thickness control and the manufacturing speed of the structure material 1 to be manufactured; specifically, a temperature that is higher than a melting temperature by 10° C. or more and is the thermal decomposition temperature of the thermoplastic resin or less is preferably given. When a thermosetting resin is used as the resin 2, an amount of heat sufficient for melting or softening a thermosetting resin raw material before it forms a crosslinked to be cured is preferably given in view of the thickness control and the manufacturing speed of the structure material 1 to be manufactured.

A method for performing thickness control is not limited to a particular method so long as it can control the heated structure precursor to be a target thickness; a method that restricts the thickness using metallic plates or the like and a method that performs thickness control by pressure given to the structure precursor are exemplified in view of the easiness of manufacture. For equipment for implementing the methods, a compression molding machine or a double belt press can be suitably used. The former is for a batch type; an intermittent type press system arranging two or more machines for heating and cooling in a row can improve productivity. The latter is for a continuous type, which can easily perform continuous processing and is thus excellent in continuous productivity.

Examples of the fiber-reinforced mat not having a nonwoven fabric-like form include a sheet substrate, a woven fabric substrate, and a non-crimped substrate in which the reinforced fibers 3 are arranged in one direction. These forms arrange the reinforced fibers 3 regularly and densely, and thus there are few voids in the fiber-reinforced mat, and the thermoplastic resin does not form a sufficient anchoring structure, and thus when it is made into a core forming layer, bonding ability decreases. In addition, when the resin 2 is a thermoplastic resin, impregnation is extremely difficult, which forms a non-impregnated part or significantly restricts alternatives about impregnating means or resin type.

In the present invention, to the extent that the features of the present invention are not impaired, a sandwich structure using the structure material 1 or the structure precursor as a core layer and using an intermediate sheet material in which the reinforced fibers 3 in a continuous form are impregnated with a resin as a skin layer is also feasible. The reinforced fibers 3 in a continuous form are continuous with a length of 100 mm or more at least in one direction; many are arranged in one direction to form an aggregate, or what is called a reinforced fiber bundle, which is continuous across the entire length of the sandwich structure. Examples of the form of the intermediate sheet material formed of the reinforced fibers 3 in a continuous form include a woven fabric including reinforced fiber bundles formed of many reinforced fibers 3 in a continuous form, a reinforced fiber bundle in which many reinforced fibers 3 in a continuous form are arranged in one direction (a unidirectional fiber bundle), and a unidirectional woven fabric including this unidirectional fiber bundle. The reinforced fibers 3 may include a plurality of fiber bundles of the same form or include a plurality of fiber bundles of different forms. The number of the reinforced fibers included in one reinforced fiber bundle is normally 300 to 48,000; in view of the manufacture of prepregs and the manufacture of woven fabrics, the number is desirably 300 to 24,000 and more desirably 1,000 to 12,000.

To control the bending modulus, lamination with the direction of the reinforced fibers 3 changed is desirably used. In particular, in efficiently increasing the modulus and strength of the sandwich structure, a continuous reinforced fiber with fiber bundles aligned in one direction (referred to as UD) is desirably used.

Examples of the structure material 1 include electric and electronic device parts such as "housings, trays, chassis, interior members, and cases of personal computers, displays, office automation (OA) devices, cellular phones, mobile information terminals, personal digital assistants (PDAs) (mobile information terminals such as electronic notepads), video cameras, optical devices, audio devices, air conditioners, lighting devices, entertainment goods, toy goods, and other home appliances"; "various kinds of members, various kinds of frames, various kinds of hinges, various kinds of arms, various kinds of wheel axles, various kinds of bearings for wheels, and various kinds of beams"; "outer plates and body parts such as hoods, roofs, doors, fenders, trunk lids, side panels, rear end panels, front bodies, under bodies, various kinds of pillars, various kinds of members, various kinds of frames, various kinds of beams, various kinds of supports, various kinds of rails, and various kinds of hinges"; "exterior parts such as bumpers, bumper beams, moldings, under covers, engine covers, current plates, spoilers, cowl louvers, and aerodynamic parts"; "interior parts such as instrument panels, seat frames, door trims, pillar trims, steering wheels, and various kinds of modules"; structure parts for automobiles and two-wheeled vehicles such as "motor parts, compressed natural gas (CNG) tanks, and gasoline tanks"; parts for automobiles and two-wheeled vehicles such as "battery trays, headlamp supports, pedal housings, protectors, lamp reflectors, lamp housings, noise shields, and spare tire covers"; building materials such as "wall members such as sound insulation walls and soundproofing walls"; and parts for aircraft such as "landing gear pods, winglets, spoilers, edges, rudders, elevators, fairings, ribs, and seats". In view of mechanical characteristics, the structure material 1 is desirably used for automobile interior and exterior, electric and electronic device housings, bicycles, structure materials for sporting goods, aircraft interior materials, boxes for transportation, and building materials. Among them, the structure material 1 is suitable for module members including a plurality of parts in particular.

EXAMPLES

The following describes the present invention in more detail with reference to examples.

(1) Volume Content Vf of Reinforced Fibers in Structure Material

After a mass Ws of a structure material was measured, the structure material was heated at 500° C. for 30 minutes in the air to burn off a resin component, a mass Wf of remaining reinforced fibers was measured, and a volume content Vf was calculated by the following expression.

$Vf(\% \text{ by volume})=(Wf/\rho f)/\{Wf/\rho f+(Ws-Wf)/\rho r\}\times 100$

ρf: the density of the reinforced fibers (g/cm³)
ρr: the density of the resin (g/cm³)

(2) Bending Test on Structure Material

Test pieces were cut out of the structure material, and the bending modulus thereof was measured in accordance with ISO 178 Method (1993). As to the test pieces, test pieces cut out in four directions including a 0° direction freely set and +45°, −45°, and 90° directions were prepared. The number of measurement n=5 was set for each of the directions, and its arithmetic mean was defined as a bending modulus Ec. As to a measurement apparatus, "INSTRON" (registered trademark) model 5565 universal material testing system (manufactured by INSTRON JAPAN Co., Ltd.) was used. From the obtained result, the specific bending modulus of the structure material was calculated by the following expression.

Specific bending modulus$=Ec^{1/3}/\rho$ (3) Oriented Angle θf of Reinforced Fibers of Structure Material A piece with a width of 25 mm was cut out of the structure material, was embedded in an epoxy resin and was polished so as to cause a perpendicular section in a sheet thickness direction to be a surface to be observed to prepare a sample. The sample was magnified 400 times with a laser microscope (VK-9510 manufactured by KEYENCE CORPORATION) to observe a fiber sectional shape. An observed image was developed onto multi-purpose image analysis software, an individual fiber section viewed in the observation image was extracted using a computer program incorporated in the software, an oval inscribed in the fiber section was provided, and the shape of the fiber section was approximated thereto (hereinafter, referred to as a fiber oval). Furthermore, for a fiber oval with an aspect ratio, which is represented by a major axial length α/a minor axial length β of the fiber oval, of 20 or more, an angle formed by the planar direction X and a major axial direction of the fiber oval was determined. The operation was repeated for samples to be observed extracted from different parts of the structure material, whereby oriented angles were measured for a total of 600 reinforced fibers, and their arithmetic mean was determined to be the oriented angle θf of the reinforced fibers.

(4) Specific Gravity ρ of Structure Material

A test piece was cut out of the structure material, and an apparent specific gravity of the structure material was measured with reference to JIS K7222 (2005). The dimensions of the test piece were 100 mm long and 100 mm wide. The length, width, and thickness of the test piece were measured with a micrometer, and a volume V of the test pieces was calculated from the obtained values. A mass M of the cut-out test piece was measured with an electronic balance. The obtained mass M and volume V were substituted into the following expression to calculate a specific gravity ρ of the structure material.

$\rho[g/cm^3]=10^3\times M[g]/V[mm^3]$ (5) Volume Content of Voids of Structure Material A test piece of 10 mm long and 10 mm wide was cut out of the structure material, and a section was observed with a scanning electron microscope (SEM) (model S-4800 manufactured by Hitachi High-Technologies Corporation) to photograph ten sites at regular intervals from the surface of the structure material with a 1,000-fold magnification. For each image, an area $A_a$ of voids within the image was determined. Furthermore, the area $A_a$ of the voids was divided by the area of the entire image to calculate a porosity. The volume content of the voids of the structure material was determined by an arithmetic mean from the porosity at a total of 50 sites photographed at ten sites each for five test pieces. In the structure material, to determine a case when the porosity of a part to the midpoint position in the thickness direction from the surface and the porosity of the residual part are different from each other, the volume content of voids was calculated for each of the ten sites photographed at regular intervals, and the volume content of voids within a range of 0% by volume or more and less than 10% by volume and the volume content of voids within a range of 10% by volume or more and 97% by volume or less were separately determined.

(6) Thickness of Resin with which Reinforced Fibers are Coated

A test piece of 10 mm long and 10 mm wide was cut out of the structure material, and a section was observed with a scanning electron microscope (SEM) (model S-4800 manufactured by Hitachi High-Technologies Corporation) to photograph ten sites freely selected with a 3,000-fold magnification. From 50 sites freely selected in which sections of the reinforced fibers were cut in an obtained image, a coating thickness of the resin with which the reinforced fibers were coated was measured. For the thickness of the resin with which the reinforced fibers were coated, the arithmetic mean of the measurement results at the 50 sites was used.

[Carbon Fiber 1]

A copolymer with polyacrylonitrile as a main component was subjected to spun processing, calcined processing, and surface oxidation treatment processing to obtain a continuous carbon fiber with a total single yarn number of 12,000. The characteristics of this continuous carbon fiber were as follows.

Single filament diameter: 7
Specific gravity: 1.8
Tensile strength: 4,600 MPa
Tensile modulus: 220 GPa

[Carbon Fiber 2]

A copolymer with polyacrylonitrile as a main component was subjected to spun processing, calcined processing, and surface oxidation treatment processing to obtain a continuous carbon fiber with a total single yarn number of 12,000. The characteristics of this continuous carbon fiber were as follows.

Single filament diameter: 7 μm
Specific gravity: 1.8
Tensile strength: 4,100 MPa
Tensile modulus: 420 GPa

[PP Resin]

A resin sheet with a weight per unit area of 100 g/m² formed of 80% by mass of an unmodified polypropylene resin ("Prime Polypro" (registered trademark) J105G manufactured by PRIME POLYMER Co, Ltd.) and 20% by mass of an acid-modified polypropylene resin ("ADMER" QB510 manufactured by Mitsui Chemicals, Inc.) was prepared. Table 1 lists the characteristics of the obtained resin sheet.

[PA Resin]

A resin film with a weight per unit area of 124 g/m² formed of a nylon 6 resin ("AMILAN" (registered trademark) CM1021T manufactured by Toray Industries, Inc.) was prepared. Table 1 lists the characteristics of the obtained resin film.

[PC Resin]

A resin film with a weight per unit area of 132 g/m² formed of a polycarbonate resin ("lupilon" (registered trademark) H-4000 manufactured by Mitsubishi Engineering-Plastics Corporation) was prepared. Table 1 lists the characteristics of the obtained resin film.

[PPS Resin]

A resin nonwoven fabric with a weight per unit area of 147 g/m² formed of a polyphenylene sulfide resin ("TORELINA" (registered trademark) M2888 manufactured by Toray Industries, Inc.) was prepared. Table 1 lists the characteristics of the obtained resin nonwoven fabric.

[Epoxy Resin]

Blended were 40 parts by mass of "Epototo" YD128 (manufactured by Tohto Kasei Co., Ltd.), 20 parts by mass of "Epototo" YD128G (manufactured by Tohto Kasei Co., Ltd.), 20 parts by mass of "Epo Tohto" 1001 (manufactured by Japan Epoxy Resins Co., Ltd.), and 20 parts by mass of "Epo Tohto" 1009 (manufactured by Japan Epoxy Resins Co., Ltd.) as epoxy resins; 4 parts by mass of DICY 7 (dicyandiamide manufactured by Japan Epoxy Resins Co., Ltd.) and 3 parts by mass of DCMU 99 (3-(3,4-dichlorophenyl)-1,1-dimethylurea manufactured by HODOGAYA CHEMICAL CO., LTD.) as curing agents; and 5 parts by mass of "Vinylec" K (polyvinyl formal manufactured by CHISSO CORPORATION) as an additive. From this blend, a resin film with a weight per unit area of 132 g/m² was prepared using a knife coater. Table 1 lists the characteristics of the obtained resin film.

[Fiber-Reinforced Mat 1]

Carbon Fiber 1 was cut into a length of 5 mm to obtain chopped carbon fibers. The chopped carbon fibers were charged into a cotton opener to obtain a cotton-like reinforced fiber aggregate in which almost no reinforced fiber bundle with an original thickness is present. This reinforced fiber aggregate was charged into a carding device having a cylinder roll with a diameter of 600 mm to form a sheet-shaped web formed of reinforced fibers. In this process, the number of revolutions of the cylinder roll was 320 rpm, and the speed of a doffer was 13 m/min. This web was stacked to obtain Fiber-Reinforced Mat 1. Table 2 lists the characteristics of the obtained Fiber-Reinforced Mat 1.

[Fiber-Reinforced Mat 2]

Figure 6:
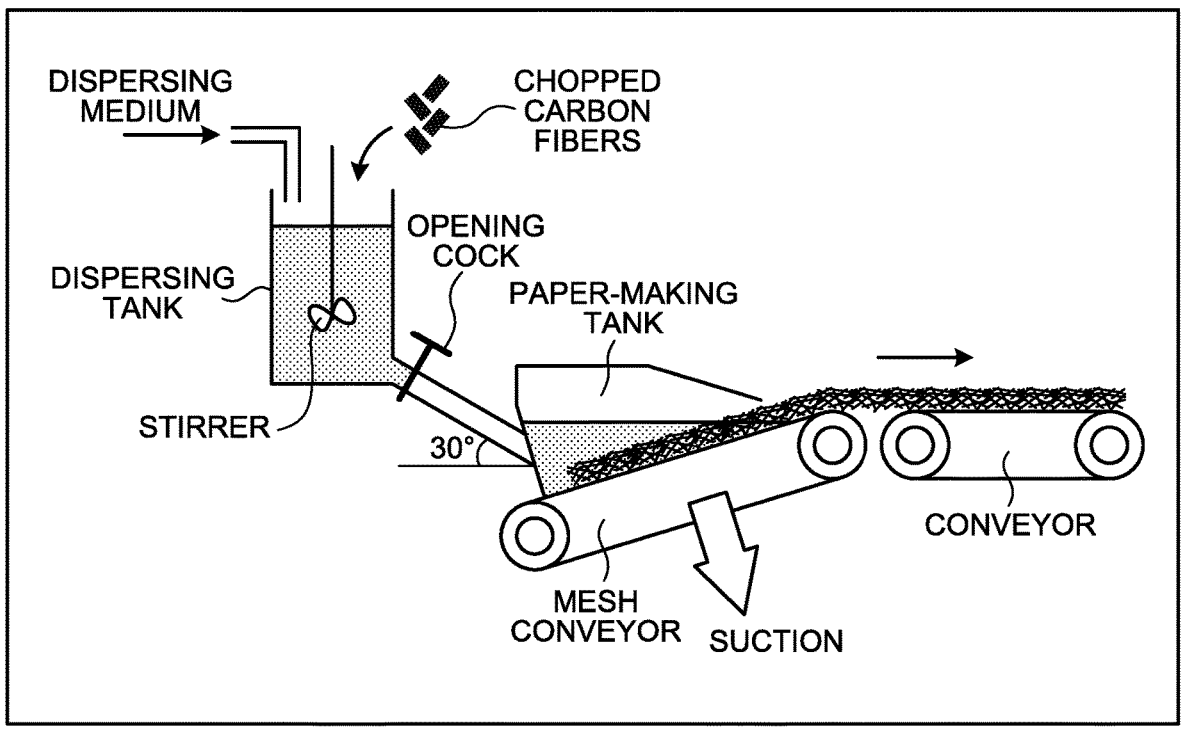
FIG. 6 is a schematic diagram of an example of an apparatus for manufacturing a fiber-reinforced mat.

Carbon Fiber 1 was cut into 3 mm with a strand cutter to obtain chopped carbon fibers. A dispersion with a concentration of 0.1% by mass containing water and a surfactant (polyoxyethylene lauryl ether (product name) manufactured by nacalai tesque) was prepared. Using this dispersion and the chopped carbon fibers, a fiber-reinforced mat was manufactured using an apparatus for manufacturing a fiber-reinforced mat illustrated in FIG. 6. The manufacturing apparatus illustrated in FIG. 6 includes a cylindrical vessel with a diameter of 1,000 mm having an opening cock at the lower part of the vessel as a dispersing tank and a linear transportation unit (an inclination angle of 30°) connecting the dispersing tank and a paper-making tank. A stirrer is attached to an opening at the top face of the dispersing tank. The chopped carbon fibers and the dispersion (a dispersing medium) can be charged from the opening. The paper-making tank is a tank including a mesh conveyor having a paper-making face with a width of 500 mm on its bottom, and a conveyor that can convey a carbon fiber substrate (a paper-making substrate) is connected to the mesh conveyor. Paper making was performed with a carbon fiber concentration in the dispersion of 0.05% by mass. The carbon fiber substrate after paper making was dried for 30 minutes in a drying oven at 200° C. to obtain Fiber-Reinforced Mat 2. The obtained weight per unit area was 50 g/m². Table 2 lists the characteristics of the obtained Fiber-Reinforced Mat 2.

[Fiber-Reinforced Mat 3]

Fiber-Reinforced Mat 3 was obtained in a manner similar to Fiber-Reinforced Mat 2 except that Carbon Fiber 1 was cut into 6 mm with a strand cutter to obtain chopped carbon fibers. Table 2 lists the characteristics of the obtained Fiber-Reinforced Mat 3.

[Fiber-Reinforced Mat 4]

Fiber-Reinforced Mat 4 was obtained in a manner similar to Fiber-Reinforced Mat 2 except that Carbon Fiber 1 was cut into 12 mm with a strand cutter to obtain chopped carbon fibers. Table 2 lists the characteristics of the obtained Fiber-Reinforced Mat 4.

[Fiber-Reinforced Mat 5]

Carbon Fiber 1 was cut into 25 mm with a strand cutter to obtain chopped carbon fibers. The obtained chopped carbon fibers were caused to fall freely from a height of 80 cm to obtain Fiber-Reinforced Mat 5 in which the chopped carbon fibers were randomly distributed. Table 2 lists the characteristics of the obtained Fiber-Reinforced Mat 5.

[Fiber-Reinforced Mat 6]

Fiber-Reinforced Mat 6 was obtained in a manner similar to Fiber-Reinforced Mat 2 except that Carbon Fiber 2 was cut into 6 mm with a strand cutter to obtain chopped carbon fibers. Table 2 lists the characteristics of the obtained Fiber-Reinforced Mat 6.

TABLE 1

|  |  | PP resin | PA resin | PC resin | PPPS resin | Epoxy resin |
|---|---|---|---|---|---|---|
| Type | — | Polypropylene | Nylon 6 | Polycarbonate | Polyphenylene sulfide | Epoxy |
| Weight per unit area | g/m² | 100 | 124 | 132 | 147 | 132 |
| Specific gravity | g/cm³ | 0.92 | 1.13 | 1.20 | 1.34 | 1.20 |
| Melting point | ° C. | 165 | 225 | — | 280 | — |
| Softening point | ° C. | — | — | 150 | — | — |
| Decomposition starting temperature | ° C. | 298 | 338 | 424 | 463 | 250 |

TABLE 2

|  |  | Fiber-Reinforced Mat 1 | Fiber-Reinforced Mat 2 | Fiber-Reinforced Mat 3 | Fiber-Reinforced Mat 4 | Fiber-Reinforced Mat 5 | Fiber-Reinforced Mat 6 |
|---|---|---|---|---|---|---|---|
| Mat form | — | Dry web | Wet web | Wet web | Wet web | Chopped strand mat | Wet web |
| Dispersion state of reinforced fibers | — | Nonwoven fabric Nearly monofilament | Nonwoven fabric Monofilament | Nonwoven fabric Monofilament | Nonwoven fabric Monofilament | Nonwoven fabric Strand (bundle of 12,000) | Nonwoven fabric Monofilament |
| Fiber type | — | Carbon Fiber 1 | Carbon Fiber 1 | Carbon Fiber 1 | Carbon Fiber 1 | Carbon Fiber 1 | Carbon Fiber 2 |
| Fiber length (Lf) | mm | 5 | 3 | 6 | 12 | 25 | 6 |
| Weight per unit area of fiber-reinforced mat | g/m² | 50 | 50 | 50 | 50 | 50 | 50 |

First Example

A laminate was prepared in which Fiber-Reinforced Mat 3 as a fiber-reinforced mat and the PP resin as a resin sheet were arranged in order of [resin sheet/fiber-reinforced mat/ resin sheet/fiber-reinforced mat/resin sheet/fiber-reinforced mat/resin sheet/fiber-reinforced mat/fiber-reinforced mat/ resin sheet/fiber-reinforced mat/resin sheet/fiber-reinforced mat/resin sheet/fiber-reinforced mat/resin sheet]. Subsequently, a structure material was obtained through the following processes (I) through (V). In the obtained structure material, voids with the reinforced fibers as columnar supports were found by sectional observation. Table 3 lists the characteristics of the obtained structure material.

(I) The laminate is arranged within a mold cavity for press molding preheated at 230° C., and the mold is closed.

(II) Subsequently, after being maintained for 120 seconds, the mold is maintained for additional 60 seconds with a pressure of 3 MPa applied.

(III) After Process (II), the mold cavity is opened, and a metallic spacer is inserted into the end thereof to perform adjustment to give a thickness of 3.4 mm when the structure material is obtained.

(IV) Subsequently, the mold cavity is again fastened, and the cavity temperature is decreased to 50° C. with the pressure maintained.

(V) The mold is opened, and the structure material is taken out of it.

Second Example

A structure material was obtained in a manner similar to the first example except that a laminate was prepared in which Fiber-Reinforced Mat 3 as a fiber-reinforced mat and the PP resin as a resin sheet were arranged in order of [resin sheet/fiber-reinforced mat/resin sheet/fiber-reinforced mat/ resin sheet/fiber-reinforced mat/resin sheet/fiber-reinforced mat/fiber-reinforced mat/resin sheet/fiber-reinforced mat/ resin sheet/fiber-reinforced mat/resin sheet/fiber-reinforced mat/resin sheet/fiber-reinforced mat/resin sheet/fiber-reinforced mat/resin sheet]. Table 3 lists the characteristics of the obtained structure material.

Third Example

A structure material was obtained in a manner similar to the first example except that a laminate was prepared in which Fiber-Reinforced Mat 3 as a fiber-reinforced mat and the PP resin as a resin sheet were arranged in order of [resin sheet/fiber-reinforced mat/resin sheet/fiber-reinforced mat/ fiber-reinforced mat/resin sheet/fiber-reinforced mat/resin sheet] and that the thickness of the metallic spacer at Process (III) was changed from 3.4 mm to 5.6 mm. Table 3 lists the characteristics of the obtained structure material.

Fourth Example

A structure material was obtained in a manner similar to the first example except that the resin sheet was changed from the PP resin to the PA resin, that the preheating temperature at Process (I) was changed from 230° C. to 260° C., that the cavity temperature at Process (IV) was changed from 50° C. to 60° C., and that the thickness of the metallic spacer at Process (III) was changed from 3.4 mm to 3.3 mm. Table 3 lists the characteristics of the obtained structure material.

Fifth Example

A structure material was obtained in a manner similar to the first example except that the resin sheet was changed from the PP resin to the PPS resin, that the preheating temperature at Process (I) was changed from 230° C. to 300° C., that the cavity temperature at Process (IV) was changed from 50° C. to 150° C., and that the thickness of the metallic spacer at Process (III) was changed from 3.4 mm to 2.9 mm. Table 3 lists the characteristics of the obtained structure material.

Sixth Example

A structure material was obtained in a manner similar to the first example except that the resin sheet was changed from the PP resin to the PC resin, that the preheating temperature at Process (I) was changed from 230° C. to 300° C., and that the cavity temperature at Process (IV) was changed from 50° C. to 80° C. Table 3 lists the characteristics of the obtained structure material.

Seventh Example

A structure material was obtained in a manner similar to the first example except that the fiber-reinforced mat was changed from Fiber-Reinforced Mat 3 to Fiber-Reinforced Mat 6. Table 3 lists the characteristics of the obtained structure material.

Eighth Example

A laminate was obtained in a manner similar to the first example with the resin sheet changed from the PP resin to the epoxy resin. Subsequently, a structure material was obtained through the following processes (I) through (V). In the obtained structure material, voids with the reinforced fibers as columnar supports were found by sectional observation. Table 3 lists the characteristics of the obtained structure material.

(I) The laminate is arranged within a mold cavity for press molding preheated at 150° C., and the mold is closed.

(II) Subsequently, the mold is maintained for additional 20 seconds with a pressure of 3 MPa applied.

(III) After Process (II), the mold cavity is opened, and a metallic spacer is inserted into the end thereof to perform adjustment to give a thickness of 3.3 mm when the structure material is obtained.

(IV) Subsequently, the mold cavity is again fastened, and the cavity temperature is decreased to 30° C. with the pressure maintained.

(V) The mold is opened, and the structure material is taken out of it.

Ninth Example

A structure material was obtained in a manner similar to the first example except that the fiber-reinforced mat was changed from Fiber-Reinforced Mat 3 to Fiber-Reinforced Mat 2. Table 3 lists the characteristics of the obtained structure material.

Tenth Example

A structure material was obtained in a manner similar to the first example except that the fiber-reinforced mat was changed from Fiber-Reinforced Mat 3 to Fiber-Reinforced Mat 4. Table 3 lists the characteristics of the obtained structure material.

Eleventh Example

A structure material was obtained in a manner similar to the first example except that the fiber-reinforced mat was changed from Fiber-Reinforced Mat 3 to Fiber-Reinforced Mat 1. Table 3 lists the characteristics of the obtained structure material.

Twelfth Example

A structure material was obtained in a manner similar to the first example except that the thickness of the metallic spacer at Process (III) was changed from 3.4 mm to 20.2 mm. Table 3 lists the characteristics of the obtained structure material.

Thirteenth Example

A laminate was obtained in a manner similar to the first example using a fiber-reinforced mat and a resin sheet similar to those of the first example. Subsequently, a structure material was obtained through the following processes (I) through (VI). In the obtained structure material, voids with the reinforced fibers as columnar supports were found by sectional observation. Table 3 lists the characteristics of the obtained structure material.

(I) The laminate is arranged within a mold cavity for press molding preheated at 230° C., and the mold is closed.

(II) Subsequently, after being maintained for 120 seconds, the mold is maintained for additional 60 seconds with a pressure of 3 MPa applied.

(III) After Process (II), the mold cavity was opened, and a spacer with a thickness of 1.2 mm was inserted into the end thereof, and the mold was maintained for 5 seconds.

(IV) Subsequently, adjustment is performed to give a thickness of 3.4 mm when the structure material is obtained.

(V) Subsequently, the mold cavity is again fastened, and the cavity temperature is decreased to 50° C. with the pressure maintained.

(VI) The mold is opened, and the structure material is taken out of it.

Fourteenth Example

A laminate was obtained in a manner similar to the first example using a fiber-reinforced mat and a resin sheet similar to those of the first example. Subsequently, a structure material was obtained through the following processes (I) through (VI). In the obtained structure material, voids with the reinforced fibers as columnar supports were found by sectional observation. Table 3 lists the characteristics of the obtained structure material.

(I) The laminate is arranged within a mold cavity for press molding preheated at 230° C., and the mold is closed.

(II) Subsequently, after being maintained for 120 seconds, the mold is maintained for additional 60 seconds with a pressure of 3 MPa applied.

(III) After Process (II), the mold cavity was opened, and a metallic spacer with a thickness of 2.0 mm was inserted into the end thereof, and the mold was maintained for 20 seconds.

(IV) Subsequently, adjustment is performed to give a thickness of 3.4 mm when the structure material is obtained.

(V) Subsequently, the mold cavity is again fastened, and the cavity temperature is decreased to 50° C. with the pressure maintained.

(VI) The mold is opened, and the structure material is taken out of it.

Fifteenth Example

A laminate was obtained in a manner similar to the first example using a fiber-reinforced mat and a resin sheet similar to those of the first example. Subsequently, a structure material was obtained through the following processes (I) through (VI). In the obtained structure material, voids with the reinforced fibers as columnar supports were found by sectional observation. Table 3 lists the characteristics of the obtained structure material.

(I) The laminate is arranged within a mold cavity for press molding preheated at 230° C., and the mold is closed.

(II) Subsequently, after being maintained for 120 seconds, the mold is maintained for additional 60 seconds with a pressure of 3 MPa applied.

(III) After Process (II), the mold cavity was opened, and metallic spacers with a thickness of 2.3 mm were inserted at regular intervals from the end to the center thereof, and the mold was maintained for 20 seconds.

(IV) Subsequently, the mold cavity is opened, and adjustment is performed to give a thickness of 3.4 mm of a part not being in contact with the metallic spacers at Process (III).

(V) Subsequently, the mold cavity is again fastened, and the cavity temperature is decreased to 50° C. with the pressure maintained.

(VI) The mold is opened, and the structure material is taken out of it.

First Comparative Example

A laminate was prepared in which Fiber-Reinforced Mat 3 as a fiber-reinforced mat and the PP resin as a resin sheet were arranged in order of [resin sheet/fiber-reinforced mat/resin sheet/fiber-reinforced mat/resin sheet/fiber-reinforced mat/fiber-reinforced mat/resin sheet/fiber-reinforced mat/resin sheet/fiber-reinforced mat/resin sheet/fiber-reinforced mat/resin sheet/resin sheet/fiber-reinforced mat/resin sheet/fiber-reinforced mat/resin sheet/fiber-reinforced mat/resin sheet/fiber-reinforced mat/resin sheet/fiber-reinforced mat/resin sheet/fiber-reinforced mat/resin sheet/fiber-reinforced mat/resin sheet/fiber-reinforced mat/resin sheet/fiber-reinforced mat/resin sheet/fiber-reinforced mat/resin sheet]. Subsequently, a structure material was obtained in a manner similar to the first example except that the metallic spacer was not used at Process (III) in the first example. Table 4 lists the characteristics of the obtained structure material.

Second Comparative Example

Seventy pieces of Fiber-Reinforced Mat 3 were stacked on one another, which was put between the PP resin to prepare a laminate. Subsequently, a structure material was obtained in a manner similar to the first example except that the thickness of the metallic spacer was changed from 3.4 mm to 3.2 mm at Process (III) in the first example. Table 4 lists the characteristics of the obtained structure material.

Third Comparative Example

A laminate was prepared in which Fiber-Reinforced Mat 5 as a fiber-reinforced mat and the PP resin as a resin sheet were arranged in order of [resin sheet/fiber-reinforced mat/fiber-reinforced mat/resin sheet]. Subsequently, a structure material was obtained in a manner similar to the first example except that the thickness of the metallic spacer was changed from 3.4 mm to 1.4 mm at Process (III) in the first example. Table 4 lists the characteristics of the obtained structure material.

Fourth Comparative Example

A laminate was prepared in which Fiber-Reinforced Mat 5 as a fiber-reinforced mat and the PP resin as a resin sheet were arranged in order of [resin sheet/fiber-reinforced mat/fiber-reinforced mat/resin sheet/resin sheet/fiber-reinforced mat/fiber-reinforced mat/resin sheet/resin sheet/fiber-reinforced mat/fiber-reinforced mat/resin sheet]. Subsequently, a structure material was obtained in a manner similar to the first example except that the structure material was obtained through the processes (I) through (V) in the first example. Table 4 lists the characteristics of the obtained structure material.

Fifth Comparative Example

A structure material was obtained in a manner similar to the first example except that Fiber-Reinforced Mat 5 was used as a fiber-reinforced mat. Table 4 lists the characteristics of the obtained structure material.

Sixth Comparative Example

A structure material was obtained in a manner similar to the first example except that a molded body only through Process (I) and Process (III) in the first example was taken out of the mold and was air-cooled. Table 4 lists the characteristics of the obtained structure material.

Seventh Comparative Example

A laminate was obtained in a manner similar to the first example using a fiber-reinforced mat and a resin sheet similar to those of the first example. Subsequently, a structure material was obtained through the following processes (I) through (VI). Table 4 lists the characteristics of the obtained structure material.

(I) The laminate is arranged within a mold cavity for press molding preheated at 230° C., and the mold is closed.

(II) Subsequently, after being maintained for 120 seconds, the mold is maintained for additional 60 seconds with a pressure of 3 MPa applied.

(III) After Process (II), the mold cavity was opened, and a spacer with a thickness of 1.8 mm was inserted into the end thereof, and the mold was maintained for 20 seconds.

(IV) Subsequently, adjustment is performed to give a thickness of 3.4 mm when the structure material is obtained.

(V) Subsequently, the mold cavity is again fastened, and the cavity temperature is decreased to 50° C. with the pressure maintained.

(VI) The mold is opened, and the structure material is taken out of it.

TABLE 3

|  |  | First Example | Second Example | Third Example | Fourth Example | Fifth Example | Sixth Example | Seventh Example | Eighth Example |
|---|---|---|---|---|---|---|---|---|---|
| Structure material | Reinforced fibers | — | Fiber-Reinforced Mat 3 | Fiber-Reinforced Mat 3 | Fiber-Reinforced Mat 3 | Fiber-Reinforced Mat 3 | Fiber-Reinforced Mat 3 | Fiber-Reinforced Mat 3 | Fiber-Reinforced Mat 6 | Fiber-Reinforced Mat 3 |
|  | Polymer | — | PP resin | PP resin | PP resin | PA resin | PPS resin | PC resin | PP resin | Epoxy resin |

TABLE 3-continued

|  |  |  |  |  |  |  |  |  |  |
|---|---|---|---|---|---|---|---|---|---|
| Volume content of reinforced fiber | % by volume | 6.7 | 9.9 | 3.3 | 6.7 | 6.7 | 6.4 | 6.7 | 6.4 |
| Volume content of resin | % by volume | 26.6 | 40.1 | 13.4 | 26.6 | 26.6 | 26.9 | 26.6 | 26.9 |
| Volume content of voids | % by volume | 66.7 | 50.0 | 83.3 | 66.7 | 66.7 | 66.7 | 66.7 | 66.7 |
| Specific gravity of entire structure material | g/cm³ | 0.36 | 0.54 | 0.18 | 0.42 | 0.48 | 0.44 | 0.36 | 0.44 |
| Thickness of structure material (St) | mm | 3.4 | 3.4 | 5.6 | 3.3 | 2.9 | 3.4 | 3.4 | 3.3 |
| Length of reinforced fibers (Lf) | mm | 6 | 6 | 6 | 6 | 6 | 6 | 6 | 6 |
| Oriented angle in sectional direction of structure material ($\theta f$) | ° | 4.01 | 2.70 | 13.49 | 3.94 | 3.43 | 3.94 | 4.01 | 3.94 |
| $Lf^2 \cdot (1 - \cos(\theta f))$ | — | 0.09 | 0.04 | 0.99 | 0.09 | 0.06 | 0.09 | 0.09 | 0.09 |
| Resin coating around reinforced fibers | Present or absent | Present | Present | Present | Present | Present | Present | Present | Present |
| Resin thickness around reinforced fibers | μm | 4.8 | 4.8 | 4.8 | 4.8 | 4.6 | 5.2 | 4.8 | 5.2 |
| Bending modulus (Ec) | GPa | 8.1 | 10.4 | 4.0 | 9.0 | 9.2 | 8.5 | 10.0 | 9.5 |
| Specific bending moulus | — | 5.58 | 4.04 | 8.82 | 4.95 | 4.37 | 4.64 | 5.98 | 4.81 |

|  |  | Ninth Example | Tenth Example | Eleventh Example | Twelfth Example | Thirteenth Example | Fourteenth Example | Fifteenth Example |
|---|---|---|---|---|---|---|---|---|
| Structure material | Reinforced fibers | Fiber-Reinforced Mat 2 | Fiber-Reinforced Mat 4 | Fiber-Reinforced Mat 1 | Fiber-Reinforced Mat 3 | Fiber-Reinforced Mat 3 | Fiber-Reinforced Mat 3 | Fiber-Reinforced Mat 3 |
|  | Polymer | PP resin | PP resin | PP resin | PP resin | PP resin | PP resin | PP resin |
| Volume content of reinforced fiber | % by volume | 6.7 | 6.7 | 6.7 | 1.1 | 6.7 | 6.7 | 6.7 |
| Volume content of resin | % by volume | 26.6 | 26.6 | 26.6 | 4.3 | 26.6 | 26.6 | 26.6 |
| Volume content of voids | % by volume | 66.7 | 66.7 | 66.7 | 94.6 | 66.7 | 66.7 | 66.7 |
| Specific gravity of entire structure material | g/cm³ | 0.36 | 0.36 | 0.36 | 0.06 | 0.36 | 0.50 | 0.50 |
| Thickness of structure material (St) | mm | 3.4 | 3.4 | 3.4 | 20.2 | 3.4 | 3.4 | 3.4 |
| Length of reinforced fibers (Lf) | mm | 3 | 12 | 5 | 6 | 6 | 6 | 6 |
| Oriented angle in sectional direction of structure material ($\theta f$) | ° | 8.19 | 2.04 | 4.9 | 4.01 | 8.14 | 4.01 | 4.01 |
| $Lf^2 \cdot (1 - \cos(\theta f))$ | — | 0.37 | 0.02 | 0.13 | 0.09 | 0.36 | 0.09 | 0.09 |
| Resin coating around reinforced fibers | Present or absent | Present | Present | Present | Present | Present | Present | Present |
| Resin thickness around reinforced fibers | μm | 4.8 | 4.8 | 4.8 | 4.8 | 4.8 | 4.8 | 4.8 |
| Bending modulus (Ec) | GPa | 7.2 | 8.3 | 8.1 | 8.1 | 8.1 | 8.7 | — |
| Specific bending moulus | — | 5.36 | 5.62 | 5.58 | 5.58 | 5.58 | 4.11 | — |

TABLE 4

|  |  |  | First Comparative Example | Second Comparative Example | Third Comparative Example | Fourth Comparative Example | Fifth Comparative Example | Sixth Comparative Example | Seventh Comparative Example |
|---|---|---|---|---|---|---|---|---|---|
| Structure material | Reinforced fibers | — | Fiber-Reinforced Mat 3 | Fiber-Reinforced Mat 3 | Fiber-Reinforced Mat 5 | Fiber-Reinforced Mat 5 | Fiber-Reinforced Mat 5 | Fiber-Reinforced Mat 3 | Fiber-Reinforced Mat 3 |
|  | Resin | — | PP resin | PP resin | PP resin | PP resin | PP resin | PP resin | PP resin |

TABLE 4-continued

|  |  | First Comparative Example | Second Comparative Example | Third Comparative Example | Fourth Comparative Example | Fifth Comparative Example | Sixth Comparative Example | Seventh Comparative Example |
|---|---|---|---|---|---|---|---|---|
| Volume content of reinforced fibers | % by volume | 20 | 60 | 3.3 | 3.3 | 6.7 | 6.7 | 6.7 |
| Volume content of resin | % by volume | 80 | 6.7 | 13.4 | 13.4 | 26.6 | 26.6 | 26.6 |
| Volume content of voids | % by volume | 0 | 33.3 | 83.3 | 83.3 | 66.7 | 66.7 | 66.7 |
| Specific gravity of entire structure material | g/cm$^3$ | 1.08 | 1.14 | 0.18 | 0.18 | 0.42 | 0.36 | 0.36 |
| Thickness of structure material (St) | mm | 2.8 | 3.2 | 1.4 | 3.4 | 3.4 | 3.4 | 3.4 |
| Length of reinforced fibers (Lf) | mm | 6 | 6 | 25 | 25 | 25 | 6 | 6 |
| Oriented angle in sectional direction of structure material (θf) | ° | 1.34 | 0.65 | 8.04 | 8.04 | 55.6 | 4.01 | 2.04 |
| Lf$^2$ · (1 − cos(θf)) | — | 0.01 | 0.00 | 6.14 | 6.14 | 271.9 | 0.09 | 0.02 |
| Resin coating around reinforced fibers | Present or absent | Complete impregnation | Absent | Partially present | Partially present | Partially present | Absent | Partially present |
| Resin thickness around reinforced fibers (only partially) | μm | — | Unmeasurable | 0.5 to 30 with uneven density | 0.5 to 30 with uneven density | 20 | Adherence only to intersections of reinforced fibers | 0.5 to 30 with uneven density |
| Bending modulus (Ec) | GPa | 14.0 | 0.2 | 1.2 | 1.2 | 2.5 | 1.0 | 2.5 |
| Specific bending modulus | — | 2.23 | 0.51 | 5.90 | 5.90 | 3.23 | 2.78 | 3.23 |

[Consideration]

It is clear that the present example is excellent in a balance between the specific bending modulus and the absolute value of the bending modulus owing to the fact that the thickness St of the structure material satisfies the conditional expression St≥Lf$^2$·(1−cos(θf)). Furthermore, the same holds true for the fourth, the fifth, the sixth, and the eighth examples, in which the resin type was changed. In contrast, in the first comparative example, in which the fiber-reinforced mat and the resin were similar to those of the first example, owing to the absence of voids, the specific bending modulus was unable to be satisfied. In the second comparative example, in which the volume ratios of the resin and the voids were adjusted, a balance between them and the volume ratio of the fiber-reinforced mat was poor, and the bending modulus was low. It is estimated that these are because coating by the resin around the reinforced fibers was not formed. In the third comparative example, the bending modulus was low. This is because the reinforced fibers not in a nearly monofilament form were used, which was not improved by the fourth comparative example, in which the thickness of the structure material was changed. In the fifth comparative example, the fiber length of the reinforced fibers was increased, and the conditional expression St≥Lf$^2$·(1−cos(θf)) was unable to be satisfied. Consequently, the absolute value of the bending modulus was unable to be satisfied. In the sixth comparative example, the reinforced fibers were not coated with the resin, and the resin was localized at intersection points of the reinforced fibers, whereby the absolute value of the bending modulus was low, although the contents of the reinforced fibers, the resin, and the voids were satisfied; as a result, the value of the specific bending modulus was unable to be satisfied. In the seventh comparative example, high-specific gravity regions were provided on the surfaces, whereas a low specific gravity region was provided at the central part; their thickness ratio was 1:1 between both surfaces and the center. The bending properties of the seventh comparative example were evaluated; owing to a bad balance in thickness ratio between the regions having voids on the surfaces and the region having voids at the center of the structure material, the properties of the layer having a high porosity at the central part were predominant, which made unable to obtain a desired property.

[Second Mode]

The following describes the structure material according to the second mode of the present invention.

FIG. 1 is a schematic diagram of a sectional structure of the structure material according to the first and second modes of the present invention. As illustrated in FIG. 1, this structure material 1 according to the second mode of the present invention includes a resin 2, reinforced fibers 3, and voids 4.

Examples of the resin 2 include thermoplastic resins and thermosetting resins. In the present invention, a thermosetting resin and a thermoplastic resin may be blended with each other; in that case, a component with an amount exceeding 50% by mass of the components contained in the resin is the name of the resin.

In one mode of the present invention, the resin 2 desirably contains at least one thermoplastic resin. Examples of the thermoplastic resin include thermoplastic resins selected from crystalline plastics such as "polyesters such as polyethylene terephthalate (PET), polybutylene terephthalate (PBT), polytrimethylene terephthalate (PTT), polyethylene naphthalate (PEN), and liquid crystal polyesters; polyolefins such as polyethylene (PE), polypropylene (PP), and polybutylene; polyoxymethylene (POM), polyamide (PA), and polyarylene sulfides such as polyphenylene sulfide (PPS); polyketone (PK), polyether ketone (PEK), polyether ether ketone (PEEK), polyether ketone ketone (PEKK), polyether nitrile (PEN), and fluorine-based resins such as polytetrafluoroethylene; and liquid crystal polymers (LCP)", amorphous plastics such as "styrene-based resins, polycarbonate (PC), polymethyl methacrylate (PMMA), polyvinyl chloride (PVC), polyphenylene ether (PPE), polyimide (PI), polyamideimide (PAI), polyetherimide (PEI), polysulfone (PSU), polyether sulfone, and polyarylate (PAR)", phenol-based resins, phenoxy resins, polystyrene-based, polyolefin-based, polyurethane-based, polyester-based, polyamide-based, polybutadiene-based, polyisoprene-based, and fluorine-based resins, acrylonitrile-based and other thermoplastic elastomers, and copolymers and modifieds of these. Among them, polyolefin is desirably used in view of the lightness of an obtained structure material, polyamide is desirably used in view of the strength thereof, amorphous plastics such as polycarbonate and styrene-based resins are desirably used in view of the surface appearance thereof, polyarylene sulfides are desirably used in view of heat resistance, polyether ether ketone is desirably used in view of the continuous use temperature thereof, and fluorine-based resins are desirably used in view of the chemical resistance thereof.

In one mode of the present invention, the resin 2 desirably contains at least one thermosetting resin. Examples of the thermosetting resin include unsaturated polyesters, vinyl esters, epoxy resins, phenol resins, urea resins, melamine resins, thermosetting polyimides, copolymers and modifieds of these, and resins obtained by blending at least two of these. The structure material according to the present invention may contain impact-resistant improvers such as elastomer and rubber components and other fillers and additives to the extent that the objects of the present invention are not impaired. Examples of fillers and additives include inorganic fillers, fire retardants, conductivity imparting agents, nucleators, ultraviolet absorbers, antioxidants, damping materials, antibacterial agents, insect repellents, deodorants, anti-coloring agents, thermal stabilizers, mold release agents, antistatic agents, plasticizers, lubricants, colorants, pigments, dyes, foaming agents, anti-foaming agents, and coupling agents.

The volume content of the resin 2 is within a range of 2.5% by volume or more and 85% by volume or less. When the volume content of the resin 2 is less than 2.5% by volume, it is unable to bind the reinforced fibers 3 within the structure material 1 together to make the reinforcing effect of the reinforced fibers 3 sufficient and to satisfy the mechanical characteristics especially bending properties of the structure material, which is thus undesirable. In contrast, when the volume content of the resin 2 is larger than 85% by volume, the resin amount is too large, and it is difficult to have a void structure, which is thus undesirable.

Examples of the reinforced fibers 3 include metallic fibers formed of aluminum, brass, stainless, and the like, PAN-based, rayon-based, lignin-based, and pitch-based carbon fibers, graphite fibers, insulating fibers formed of glass and the like, organic fibers formed of aramid, PBO, polyphenylene sulfide, polyester, acrylic, nylon, polyethylene, and the like, and inorganic fibers formed of silicon carbide, silicon nitride, and the like. Surface treatment may be applied to these fibers. Examples of the surface treatment include coating treatment with metal as a conductor, treatment with coupling agents, treatment with sizing agents, treatment with binders, and adhesion treatment for additives. One of these fibers may be used alone, or two or more of them may be used in combination. Among them, PAN-based, pitch-based, and rayon-based carbon fibers, which are excellent in specific strength and specific stiffness, are desirably used in view of a weight reduction effect. Glass fibers are desirably used in view of increasing the economy of the obtained structure material; carbon fibers and glass fibers are desirably used in combination in view of a balance between mechanical characteristics and economy in particular. Furthermore, aramid fibers are desirably used in view of increasing the impact absorption and shaping property of the obtained structure material; carbon fibers and aramid fibers are desirably used in combination in view of a balance between mechanical characteristics and impact absorption in particular. Reinforced fibers coated with metal such as nickel, copper, or ytterbium can also be used in view of increasing the conductivity of the obtained structure material. Among them, PAN-based carbon fibers, which are excellent in strength and mechanical characteristics such as modulus, are more desirably used.

The reinforced fibers 3 are desirably discontinuous and dispersed in a nearly monofilament form and in a random manner. The reinforced fibers 3 are prepared in such a manner, whereby when a sheet-shaped structure precursor or structure material is molded by applying external force, shaping into a complex shape is made easy. In addition, the reinforced fibers 3 are prepared in such a manner, whereby voids formed by the reinforced fibers 3 become fine, and weak parts at fiber bundle ends of the reinforced fibers 3 in the structure material 1 can be minimized, and thus giving isotropy in addition to excellent reinforcing efficiency and reliability. The nearly monofilament indicates that a reinforced fiber single yarn is present as less than 500 fine-denier strands. The reinforced fibers 3 are more desirably dispersed in a monofilament form.

Being dispersed in a nearly monofilament form or monofilament form indicates that, for a reinforced fiber 3 freely selected in the structure material 1, the rate of single filaments having a two-dimensional contact angle of 1° or more (hereinafter, also referred to as a fibers dispersed rate) is 80% or more or, in other words, that a bundle in which two or more single filaments in the structure material 1 are in contact with each other to be parallel to each other is less than 20%. Consequently, the mass fraction of a fiber bundle with a filament number of 100 or less at least in the reinforced fibers 3 particularly preferably corresponds to 100%.

The two-dimensional contact angle refers to an angle formed by a single filament and a single filament being in contact with this single filament in the case of discontinuous reinforced fibers and is defined as an angle on an acute angle side within a range of 0° or more and 90° or less out of angles formed by the single filaments being in contact with each other. The following further describes this two-dimensional contact angle with reference to a drawing. FIG. 2 is a schematic diagram of an example of a dispersion state of the reinforced fibers in a fiber-reinforced mat when observed in a planar direction (FIG. 2(a)) and a thickness direction (FIG. 2(b)). With reference to a single filament 11a, the single filament 11a is observed to cross single filaments 11b to 11f in FIG. 2(a), whereas the single filament 11a is not in contact with the single filaments 11e and 11f in FIG. 2(b). In this case, the single filaments 11b to 11d are objects for which the two-dimensional contact angle is evaluated for the single filament 11a as the reference; the two-dimensional contact angle is an angle A on the acute angle side within a range of 0° or more and 90° or less out of the two angles formed by the two single filaments being in contact with each other.

A method for measuring the two-dimensional contact angle is not limited to a particular method; a method can be exemplified that observes the orientation of the reinforced fibers 3 from a surface of the structure material 1, for example. In this case, the surface of the structure material 1 is polished to expose the reinforced fibers 3, whereby the reinforced fibers 3 become easier to be observed. Another example that can be exemplified is a method that performs X-ray CT transmission observation to take an orientation image of the reinforced fibers 3. For the reinforced fibers 3 having high X-ray transmissivity, fibers for a tracer are mixed into the reinforced fibers 3, or a chemical for a tracer is applied to the reinforced fibers 3, whereby the reinforced fibers 3 become easier to be observed, which is thus desirable. When measurement is difficult by the methods, a method can be exemplified that puts the structure material 1 into a high-temperature environment such as an oven to burn off a resin component and then observes the orientation of the reinforced fibers 3 from the reinforced fibers 3 that have been taken out using an optical microscope or an electron microscope.

The fibers dispersed rate is measured by the following procedure based on the method of observation described above. Specifically, the two-dimensional contact angle is measured for all the single filaments (the single filaments 11b to 11d in FIG. 2) being in contact with a single filament selected at random (the signal filament 11a in FIG. 2). This measurement is performed for 100 single filaments, and a rate is calculated from the ratio of the number of signal filaments having a two-dimensional contact angle of 1° or more to the total number of all the single filaments for which the two-dimensional contact angle is measured.

Furthermore, the reinforced fibers 3 are particularly desirably dispersed in a random manner. The reinforced fibers 3 being dispersed in a random manner refers to the fact that the arithmetic mean of a two-dimensional oriented angle of a reinforced fiber 3 freely selected in the structure material 1 is within a range of 30° or more and 60° or less. The two-dimensional oriented angle refers to an angle formed by a single filament of the reinforced fiber 3 and a single filament crossing this single filament and is defined as an angle on an acute angle side within a range of 0° or more and 90° or less out of angles formed by the single filaments crossing each other.

The following further describes this two-dimensional oriented angle with reference to a drawing. In FIGS. 2(a) and (b), with reference to the single filament 11a, the single filament 11a crosses the other single filaments 11b to 11f. The crossing means a state in which a single filament as a reference is observed to cross other single filaments on a two-dimensional plane observed, does not necessarily require the single filament 11a and the single filaments 11b to 11f to be in contact with each other, and does not exclude a state in which the single filament 11a is observed to cross the single filaments 11b to 11f when viewed in a projected manner. In other words, focusing on the single filament 11a as the reference, all the single filaments 11b to 11f are objects for which the two-dimensional oriented angle is evaluated; in FIG. 2(a), the two-dimensional oriented angle is the angle A on the acute angle side within a range of 0° or more and 90° or less out of the two angles formed by the two crossing single filaments.

A method for measuring the two-dimensional oriented angle is not limited to a particular method; a method can be exemplified that observes the orientation of the reinforced fibers 3 from a surface of the structure element, for example, for which means similar to the method for measuring the two-dimensional contact angle described above can be employed. The mean of the two-dimensional oriented angle is measured by the following procedure. Specifically, the mean of the two-dimensional oriented angle is measured for all the single filaments (the single filaments 11b to 11f in FIG. 2) crossing a single filament selected at random (the signal filament 11a in FIG. 2). When there are a large number of other single filaments crossing a single filament, for example, an arithmetic mean measured by selecting 20 other crossing single filaments at random may be substituted. This measurement is repeated a total of five times with reference to other single filaments, and its arithmetic mean is calculated as the arithmetic mean of the two-dimensional oriented angle.

The reinforced fibers 3 are dispersed in a nearly monofilament form and in a random manner, whereby the performance given by the reinforced fibers 3 dispersed in a nearly monofilament form described above can be increased to the maximum. In addition, isotropy can be imparted to the mechanical characteristics of the structure material 1. In view of the foregoing, the fibers dispersed rate of the reinforced fibers 3 is desirably 90% or more and more desirably closer to 100%. The arithmetic mean of the two-dimensional oriented angle of the reinforced fibers 3 is desirably within a range of 40° or more and 50° or less and more desirably closer to 45°, which is an ideal angle.

Examples of the reinforced fibers 3 not having a nonwoven fabric-like form include a sheet substrate, a woven fabric substrate, and a non-crimped substrate in which the reinforced fibers 3 are arranged in one direction. These forms arrange the reinforced fibers 3 regularly and densely, and thus there are few voids 4 in the structure material 1, which makes the impregnation of the resin 2 extremely difficult and may form a non-impregnated part or significantly restrict alternatives about impregnating means and/or resin type.

The form of the reinforced fibers 3 may be any of a continuous reinforced fiber having a length similar to that of the structure material 1 and a discontinuous reinforced fiber with a finite length cut into a certain length; it is desirably a discontinuous reinforced fiber in view of easily impregnating the reinforced fibers 3 with the resin 2 or being able to easily adjust the amount of the resin 2.

The volume content of the reinforced fibers 3 is within a range of 0.5% by volume or more and 55% by volume or less. When the volume content of the reinforced fibers 3 is less than 0.5% by volume, the reinforcing effect caused by the reinforced fibers 3 is unable to be sufficient, which is thus undesirable. In contrast, when the volume content of the reinforced fibers 3 is larger than 55% by volume, the volume content of the resin 2 relative to the reinforced fibers 3 is relatively low, and it is unable to bind the reinforced fibers 3 within the structure material 1 together to make the reinforcing effect of the reinforced fibers 3 sufficient and to satisfy the mechanical characteristics especially bending properties of the structure material 1, which is thus undesirable.

The reinforced fibers 3 are coated with the resin 2, in which the thickness of the resin 2 is preferably within a range of 1 μm or more and 15 μm or less. As to the coated state of the reinforced fibers 3 coated with the resin 2, coating at least intersection points of the single filaments of the reinforced fibers 3 contained in the structure material 1 is sufficient in view of the shape stability of the structure material 1 and the easiness and the degree of freedom in thickness control; as a more desirable manner, the resin 2 is desirably coated around the reinforced fibers 3 with the above thickness. This state means that the surface of the reinforced fibers 3 is not exposed owing to the resin 2 or, in other words, that the reinforced fibers 3 form an electric wire-shaped coating by the resin 2. This formation further causes the structure material 1 to have shape stability and makes its expression of mechanical characteristics sufficient. In addition, the coated state of the reinforced fibers 3 coated with the resin 2 is not required to be coated across the whole of the reinforced fibers 3 and may be within a range in which the shape stability, the bending modulus, and the bending strength of the structure material 1 according to the present invention are not impaired.

The longer of the mass mean fiber length of the reinforced fibers 3 is desirably within a range of 1 mm or more and 15 mm or less. With this length, the reinforcing efficiency of the reinforced fibers 3 can be increased, and thus excellent mechanical characteristics can be imparted to the structure material 1. When the longer of the mass mean fiber length of the reinforced fibers 3 is less than 1 mm, the voids 4 within the structure material 1 are unable to be formed efficiently, and the specific gravity may increase; in other words, it is difficult to obtain the structure material 1 with a desired thickness even with the same mass, which is thus undesirable. In contrast, when the longer of the mass mean fiber length of the reinforced fibers 3 is longer than 15 mm, the reinforced fibers 3 are likely to bend by their self-weight within the structure material 1 to cause the expression of mechanical characteristics to be hindered, which is thus undesirable. The resin component of the structure material 1 is removed by a method such as burning or eluting, 400 remaining reinforced fibers 3 are selected at random, and the lengths thereof are measured down to 10 μm; the longer of the mass mean fiber length can be calculated as the mean length thereof.

The voids 4 in the present invention each indicate a space formed by the reinforced fibers 3 coated with the resin 2 serving as columnar supports and overlapping with each other or crossing each other. When a structure precursor in which the reinforced fibers 3 are impregnated with the resin 2 in advance is heated to obtain a structure material, for example, the melting or softening of the resin 2 along with heating raises the reinforced fibers 3 to form the voids 4. This phenomenon is based on the property of the reinforced fibers 3 inside the structure precursor in a compressed state by pressurization rising by hair raising force caused by their modulus. The content of the voids 4 in the structure material 1 is within a range of 10% by volume or more and 97% by volume or less. When the content of the voids 4 is less than 10% by volume, the specific gravity of the structure material 1 is high, and lightness is not satisfied, which is thus undesirable. In contrast, when the content of the voids 4 is larger than 97% by volume or, in other words, the thickness of the resin 2 coated around the reinforced fibers 3 is small, and the reinforcing of the reinforced fibers 3 in the structure material 1 is not performed sufficiently to decrease mechanical characteristics, which is thus undesirable. The upper limit of the content of the voids 4 is desirably 97% by volume. In the present invention, as to the volume content, the sum of the respective volume contents of the resin 2, the reinforced fibers 3, and the voids 4 included in the structure material 1 is defined as 100% by volume.

A thickness St of the structure material 1 satisfies a conditional expression $St \geq Lf^2 \cdot (1-\cos(\theta f))$ where the length of the reinforced fibers 3 is Lf and the oriented angle of the reinforced fibers 3 in a sectional direction of the structure material 1 is θf. The thickness St of the structure material 1 not satisfying the conditional expression indicates that the reinforced fibers 3 in the structure material 1 are bending or that a balance between the structure material 1 with a desired thickness and a fiber length is poor. This indicates that the structure material 1 is poor in the degree of freedom in thickness design because the feature of the charged reinforced fibers 3 is unable to be sufficiently expressed, and furthermore, as to characteristics using the tensile strength and the tensile modulus of the reinforced fibers 3 among the mechanical characteristics of the structure material 1, an efficient reinforcing effect is unable to be obtained because the straightness of the reinforced fibers 3 is lost, which is thus undesirable. In the conditional expression, the value is preferably within a range of 2% or more and 20% or less of the thickness St of the structure material 1 and particularly preferably within a range of 5% or more and 18% or less thereof considering that a balance can be obtained between bending modulus and specific bending modulus as the characteristics of the structure material 1 formed by the length and the oriented angle of the reinforced fibers 3 and that owing to the fiber length and its oriented angle in the structure material 1, deformation in a state before solidification or curing during a molding process is easily performed to facilitate the molding of the desired structure material 1. The units used for the conditional expression are St [mm], Lf [mm], and θf [°].

The length Lf of the reinforced fibers 3 can be calculated as the longer of the mass mean fiber length calculated from the lengths obtained by removing the resin component of the structure material 1 by a method such as burning or eluting, selecting 400 remaining reinforced fibers 3 at random, and measuring the lengths thereof down to 10 μm. The oriented angle θf of the reinforced fibers 3 in the sectional direction of the structure material 1 is the degree of inclination relative to the sectional direction of the structure material 1 or, in other words, the degree of inclination of the reinforced fibers 3 relative to the thickness direction. A larger value indicates that the reinforced fibers 3 are inclined in an upright manner in the thickness direction, and the value is given within a range of 0° or more and 90° or less. In other words, the oriented angle θf of the reinforced fibers 3 is set to be within the range, whereby reinforcing function in the structure material 1 can be expressed more effectively. The upper limit of the oriented angle θf of the reinforced fibers 3, which is not limited to a particular value, is desirably 60° or less and more desirably 45° or less in view of the expression of bending modulus as the structure material 1. When the oriented angle θf of the reinforced fibers 3 is less than 3°, the reinforced fibers 3 in the structure material 1 are oriented in a planar manner or, in other words, a two-dimensional manner, and the degree of freedom in the thickness of the structure material 1 decreases, and lightness is unable to be satisfied, which is thus undesirable. For this reason, the oriented angle θf of the reinforced fibers 3 is preferably 3° or more.

The oriented angle θf of the reinforced fibers 3 can be measured based on observation of a perpendicular section relative to the planar direction of the structure material 1. FIG. 3 is a schematic diagram of an example of sectional structures in the planar direction (FIG. 3(*a*)) and the thickness direction (FIG. 3(*b*)) of the structure material according to the first and second modes of the present invention. In FIG. 3(*a*), the sections of reinforced fibers 3*a* and 3*b* are approximated to an oval shape in order to simplify measurement. In the section of the reinforced fiber 3*a*, its aspect ratio of the oval (=oval major axis/oval minor axis) is viewed to be smaller, whereas in the section of the reinforced fiber 3*b*, its aspect ratio of the oval is viewed to be larger. Meanwhile, according to FIG. 3(b), the reinforced fiber 3a has an inclination nearly parallel relative to a thickness direction Y, whereas the reinforced fiber 3b has a certain amount of inclination relative to the thickness direction Y. In this case, as to the reinforced fiber 3b, an angle θx formed by a planar direction X of the structure material 1 and a fiber principal axis (the major axial direction in the oval) α is nearly equal to an out-of-plane angle θf of the reinforced fiber 3b. In contrast, as to the reinforced fiber 3a, there is a large deviation between the angle θx and the oriented angle θf, and it cannot be said that the angle θx is reflective of the oriented angle θf. Consequently, when the oriented angle θf is read from the perpendicular section relative to the planar direction of the structure material 1, the aspect ratio of the oval of a fiber section having a certain value or more is extracted, whereby the accuracy of detecting the oriented angle θf can be increased.

For an indicator of the aspect ratio of the oval to be extracted, a method can be employed that when the sectional shape of the single filament is close to a perfect circle or, that is, when a fiber aspect ratio in a section perpendicular to the longitudinal direction of the reinforced fibers is 1.1 or less, the angle θx formed by the planar direction X and the fiber principal axis α is measured for the reinforced fibers 3 having an aspect ratio of the oval of 20 or more, and this angle is employed as the oriented angle θf. In contrast, when the sectional shape of the single filament is an oval shape, a cocoon shape or the like, in which the fiber aspect ratio is larger than 1.1, it is better to focus on the reinforced fibers 3 having a larger aspect ratio of the oval to measure the oriented angle θf; the reinforced fibers 3 having an aspect ratio of the oval of 30 or more when the fiber aspect ratio is 1.1 or more and less than 1.8, having an aspect ratio of the oval of 40 or more when the fiber aspect ratio is 1.8 or more and less than 2.5, and having an aspect ratio of the oval of 50 or more when the fiber aspect ratio is 2.5 or more may be selected, and the oriented angle θf thereof may be measured.

The specific bending modulus of a first part of the structure material 1 represented as $Ec^{1/3} \cdot \rho^{-1}$ is within a range of 1 or more and less than 3 where the bending modulus of the structure material 1 is Ec and the specific gravity of the structure material 1 is ρ. When the specific bending modulus of the first part of the structure material 1 is less than 1, the weight reduction effect of the structure material 1 is lost, which is thus undesirable. In contrast, when the specific bending modulus of the first part of the structure material 1 is larger than 3, that means that the bending modulus is low when the structure material 1 is formed of a single composition, which is thus undesirable. More desirably, the specific bending modulus of the first part of the structure material 1 is less than 3 exceeding 2.3, which is a general specific bending modulus of carbon fiber-reinforced plastic composite materials attracting attention for their weight reduction effect.

The specific bending modulus of a second part of the structure material 1 different from the first part is within a range of 3 or more and 20 or less. When the specific bending modulus of the second part of the structure material 1 is less than 3, even if the bending modulus is high, the specific gravity is also high, and a desired weight reduction effect is unable to be obtained, which is thus undesirable. In contrast, when the specific bending modulus of the second part of the structure material 1 is larger than 20, it is indicated that the bending modulus is low, although the weight reduction effect is sufficient; it is difficult to maintain a shape desired as the structure material 1, and the bending modulus of the structure material 1 itself is poor, which is thus undesirable.

The specific bending modulus of steel materials and aluminum is 1.5 or less in general; the region of the specific bending modulus extremely excellent compared with these metallic materials is achieved. Furthermore, the specific bending modulus of the second part of the structure material 1 is 3 or more exceeding 2.3, which is a general specific bending modulus of carbon fiber-reinforced plastic composite materials attracting attention for their weight reduction effect, and further desirably 5 or more.

The bending modulus Ec of the second part of the structure material 1 is desirably 6 GPa or more. The upper limit of the bending modulus is not limited; it is generally preferably 6 GPa or more because the bending modulus presents no problem when the structure material 1 is designed as a member. Furthermore, the bending modulus desirably has isotropy in view of the degree of freedom in design in actual members. In contrast, the upper limit is not set for the bending modulus so long as the effects of the present invention are not impaired; in the structure material according to the present invention, about 30 GPa can be the upper limit in view of relation between the volume content and the bending modulus of the reinforced fibers, the resin, and the voids. The bending modulus being 30 GPa or more indicates in general that the content of the reinforced fibers is high and that the volume content of the voids is low, which may lead to a high specific gravity and an increase in the weight of a product.

As illustrated in FIG. 4, first parts R1 and a second part R2 of the structure material 1 may be present at different positions in the thickness direction of the structure material 1. As illustrated in FIG. 5, the first parts R1 and the second part R2 of the structure material 1 may be present at different positions in the planar direction of the structure material. As illustrated in FIG. 4, when the specific gravity of the first parts R1 is high or, in other words, when there are few voids, the first parts R1 function as skin layers represented by what is called a sandwich structure or the like. Specifically, the skin layers as skins can contribute to an increase in the bending modulus. Furthermore, when the specific gravity of the second part R2 is low or, in other words, when there are many voids, the second part R2 functions as a core layer represented by what is called a sandwich structure or the like. Specifically, the core layer as a core material does not contribute to an increase in the bending modulus very much, and only its specific gravity is effectively used; in addition, the thickness has a large effect on the bending stiffness of the structure material 1, and thus a light, highly stiff structure material can be achieved. In FIG. 5, parts bearing various kinds of loads are high in specific gravity, that is, the first parts R1, whereas a part bearing almost no load is the second part R2, whereby design efficient for the lightness of the structure material can be performed. Furthermore, the thickness of the second part R2 is made larger than that of each of the first parts R1, whereby the bending stiffness of the entire structure material can be designed, and deformation such as warpage or twist in a molded object when being made into a product can be reduced. Furthermore, in the structure material according to the present invention, the shapes illustrated in FIG. 4 and FIG. 5 can be obtained from a single composition and structure precursor, and deformation and a faulty joint caused by a coefficient of linear expansion causing a problem in the composition of heterogeneous materials are not required to be regarded as a problem, which is desirable.

Furthermore, the porosity of the first part of the structure material 1 is desirably within a range of 0% by volume or more and less than 10% by volume, and the porosity of the residual part is desirably within a range of 10% by volume or more and 97% by volume or less. With this porosity, even with a single composition, the first part and the second part are formed as described above, whereby the part contributing the stiffness can be used as the first part, and design efficient for the lightness of the structure material can be performed. Furthermore, the thickness of the second part of is made larger than that of the first part, whereby the bending stiffness of the entire structure material can be designed, weight reduction can be partially performed.

The oriented angle θf of the reinforced fibers 3 of the first part of the structure material 1 is desirably within a range of 5° or more and 15° or less, and the oriented angle θf of the reinforced fibers 3 at other positions is desirably within a range of 5° or more and 45° or less. Not limited to a case in which the structure material is obtained from a single composition, the oriented angle θf of the first part being within a range of 5° or more and 15° or less means that the reinforced fibers 3 are oriented in the planar direction; consequently, the reinforced fibers 3 bear loads, and thus in-plane strength can be increased. Furthermore, the oriented angle θf of the second part being within a range of 5° or more and 45° or less enables voids to be formed efficiently in the structure material; consequently, weight reduction can be achieved. The oriented angle of the first part is desirably within a range of 5° or more and 10° or less, and the oriented angle of the second part is desirably within a range of 5° or more and 30° or less in view of a balance between compression characteristics and lightness as the structure material.

The specific gravity ρ of the structure material 1 is desirably 0.9 g/cm$^3$ or less. When the specific gravity ρ of the structure material 1 is larger than 0.9 g/cm$^3$, that means that mass as the structure material 1 increases, resulting in an increase in mass when being made into a product, which is thus undesirable. The lower limit of the specific gravity is not limited; in a structure material formed of reinforced fibers and a resin in general, a value calculated from the respective volume ratios of the reinforced fibers, the resin, and the voids as its components can be the lower limit. In the structure material according to the present invention, both when the structure material is used alone and when it is used in combination with another member, the specific gravity of the structure material itself is desirably 0.03 g/cm$^3$ or more in view of maintaining the mechanical characteristics of the structure material, although it varies depending on the reinforced fibers and the resin used.

The reinforced fibers 3 in the present invention desirably have a nonwoven fabric-like form in view of the easiness of the impregnation of the resin 2 into the reinforced fibers 3. Furthermore, the reinforced fibers 3 have a nonwoven fabric-like form, whereby in addition to easy handleability of the nonwoven fabric itself, impregnation can be made easy even in the case of thermoplastic resins, which are generally high in viscosity, which is thus desirable. The nonwoven fabric-like shape indicates a form in which strands and/or monofilaments of the reinforced fibers 3 are dispersed irregularly in a planar form; examples thereof include a chopped strand mat, a continuous strand mat, a paper-making mat, a carding mat, and an air-laid mat (hereinafter, referred to collectively as a fiber-reinforced mat).

Examples of a method for manufacturing the fiber-reinforced mat included in the structure material 1 include a method for manufacturing the fiber-reinforced mat by dispersing the reinforced fibers 3 in a strand and/or a nearly monofilament form in advance. Examples of the method for manufacturing the fiber-reinforced mat include a dry process such as an air-laid method that disperses the reinforced fibers 3 to form a sheet with an airflow and a carding method that shapes the reinforced fibers 3 while mechanically carding them to form a sheet and a wet process by Radright method that stirs the reinforced fibers 3 in the water to make paper as known techniques. Examples of means for making the reinforced fibers 3 closer to a monofilament form include in the dry process a method that provides fiber-opening bars, a method that vibrates fiber-opening bars, a method that makes meshes of a card finer, and a method that adjusts the rotational speed of a card. Examples thereof include in the wet process a method that adjusts the stirring condition of the reinforced fibers 3, a method that dilutes a reinforced fiber concentration of a dispersion, a method that adjusts the viscosity of a dispersion, and a method that inhibits an eddy when a dispersion is transferred. In particular, the fiber-reinforced mat is desirably manufactured by the wet process, and the concentration of charged fibers is increased or the flow rate (flow) of a dispersion and the speed of a mesh conveyor are adjusted, whereby the rate of the reinforced fibers 3 in the fiber-reinforced mat can be easily adjusted. The speed of the mesh conveyor is decreased relative to the flow rate of the dispersion, whereby the orientation of fibers in an obtained fiber-reinforced mat is difficult to be directed to a taking direction, and a bulky fiber-reinforced mat can be manufactured, for example. The fiber-reinforced mat may be formed of the reinforced fibers 3 alone. The reinforced fibers 3 may be mixed with a matrix resin component in a powdery form or a fibrous form. The reinforced fibers 3 may be mixed with organic compounds or inorganic compounds. The reinforced fibers 3 may be bonded to each other with a resin component.

Furthermore, the fiber-reinforced mat may be impregnated with the resin 2 in advance to form a structure precursor. For a method for manufacturing the structure precursor according to the present invention, a method that applies pressure to the fiber-reinforced mat with the resin 2 being in a state heated at a temperature melting or softening or more to impregnate the fiber-reinforced mat therewith is desirably used in view of the easiness of manufacture. Specifically, a method that melt-impregnates the fiber-reinforced mat with a laminate arranging the resin 2 from both sides in the thickness direction can be desirably exemplified.

For equipment for implementing the methods, a compression molding machine or a double belt press can be suitably used. The former is for a batch type; an intermittent type press system arranging two or more machines for heating and cooling in a row can improve productivity. The latter is for a continuous type, which can easily perform continuous processing and is thus excellent in continuous productivity.

In manufacturing the structure material 1 according to the present invention, a method that manufactures it by at least the following processes [1] and [2] is preferably employed in view of the easiness of manufacture.

Process [1]: a process for applying pressure with the resin 2 heated at a temperature melting or softening or more and impregnating the fiber-reinforced mat with the resin 2 to prepare a structure precursor Process [2]: a process for performing thickness adjustment with the structure precursor heated to swell it Process [2] is a process for performing thickness adjustment with the structure precursor obtained at Process [1] heated to swell it. The temperature heated in this process preferably gives an amount of heat sufficient for melting or softening the resin 2 when the resin 2 included in the structure material 1 is a thermoplastic resin in view of the thickness control and the manufacturing speed of the structure material 1 to be manufactured; specifically, a temperature that is higher than a melting temperature by 10° C. or more and is the thermal decomposition temperature of the thermoplastic resin or less is preferably given. When a thermosetting resin is used as the resin 2, an amount of heat sufficient for melting or softening a thermosetting resin raw material before it forms a crosslinked to be cured is preferably given in view of the thickness control and the manufacturing speed of the structure material 1 to be manufactured.

A method for performing thickness control is not limited to a particular method so long as it can control the heated structure precursor to be a target thickness; a method that restricts the thickness using metallic plates or the like and a method that performs thickness control by pressure given to the structure precursor are exemplified in view of the easiness of manufacture. For equipment for implementing the methods, a compression molding machine or a double belt press can be suitably used. The former is for a batch type; an intermittent type press system arranging two or more machines for heating and cooling in a row can improve productivity. The latter is for a continuous type, which can easily perform continuous processing and is thus excellent in continuous productivity.

Examples of the fiber-reinforced mat not having a non-woven fabric-like form include a sheet substrate, a woven fabric substrate, and a non-crimped substrate in which the reinforced fibers 3 are arranged in one direction. These forms arrange the reinforced fibers 3 regularly and densely, and thus there are few voids in the fiber-reinforced mat, and the thermoplastic resin does not form a sufficient anchoring structure, and thus when it is made into a core forming layer, bonding ability decreases. In addition, when the resin 2 is a thermoplastic resin, impregnation is extremely difficult, which forms a non-impregnated part or significantly restricts alternatives about impregnating means or resin type.

In the present invention, to the extent that the features of the present invention are not impaired, a sandwich structure using the structure material 1 or the structure precursor as a core layer and using an intermediate sheet material in which the reinforced fibers 3 in a continuous form are impregnated with a resin as a skin layer is also feasible. The reinforced fibers 3 in a continuous form are continuous with a length of 100 mm or more at least in one direction; many are arranged in one direction to form an aggregate, or what is called a reinforced fiber bundle, which is continuous across the entire length of the sandwich structure. Examples of the form of the intermediate sheet material formed of the reinforced fibers 3 in a continuous form include a woven fabric including reinforced fiber bundles formed of many reinforced fibers 3 in a continuous form, a reinforced fiber bundle in which many reinforced fibers 3 in a continuous form are arranged in one direction (a unidirectional fiber bundle), and a unidirectional woven fabric including this unidirectional fiber bundle. The reinforced fibers 3 may include a plurality of fiber bundles of the same form or include a plurality of fiber bundles of different forms. The number of the reinforced fibers included in one reinforced fiber bundle is normally 300 to 48,000; in view of the manufacture of prepregs and the manufacture of woven fabrics, the number is desirably 300 to 24,000 and more desirably 1,000 to 12,000.

To control the bending modulus, lamination with the direction of the reinforced fibers 3 changed is desirably used. In particular, in efficiently increasing the modulus and strength of the sandwich structure, a continuous reinforced fiber with fiber bundles aligned in one direction (referred to as UD) is desirably used.

Examples of the structure material 1 include electric and electronic device parts such as "housings, trays, chassis, interior members, and cases of personal computers, displays, OA devices, cellular phones, mobile information terminals, PDAs (mobile information terminals such as electronic notepads), video cameras, optical devices, audio devices, air conditioners, lighting devices, entertainment goods, toy goods, and other home appliances"; "various kinds of members, various kinds of frames, various kinds of hinges, various kinds of arms, various kinds of wheel axles, various kinds of bearings for wheels, and various kinds of beams"; "outer plates and body parts such as hoods, roofs, doors, fenders, trunk lids, side panels, rear end panels, front bodies, under bodies, various kinds of pillars, various kinds of members, various kinds of frames, various kinds of beams, various kinds of supports, various kinds of rails, and various kinds of hinges"; "exterior parts such as bumpers, bumper beams, moldings, under covers, engine covers, current plates, spoilers, cowl louvers, and aerodynamic parts"; "interior parts such as instrument panels, seat frames, door trims, pillar trims, steering wheels, and various kinds of modules"; structure parts for automobiles and two-wheeled vehicles such as "motor parts, CNG tanks, and gasoline tanks"; parts for automobiles and two-wheeled vehicles such as "battery trays, headlamp supports, pedal housings, protectors, lamp reflectors, lamp housings, noise shields, and spare tire covers"; building materials such as "wall members such as sound insulation walls and soundproofing walls"; and parts for aircraft such as "landing gear pods, winglets, spoilers, edges, rudders, elevators, fairings, ribs, and seats". In view of mechanical characteristics, the structure material 1 is desirably used for automobile interior and exterior, electric and electronic device housings, bicycles, structure materials for sporting goods, aircraft interior materials, boxes for transportation, and building materials. Among them, the structure material 1 is suitable for module members including a plurality of parts in particular.

EXAMPLES

The following describes the present invention in more detail with reference to examples.

(1) Volume Content Vf of Reinforced Fibers in Structure Material

After a mass Ws of a structure material was measured, the structure material was heated at 500° C. for 30 minutes in the air to burn off a resin component, a mass Wf of remaining reinforced fibers was measured, and a volume content Vf was calculated by the following expression.

$$Vf(\% \text{ by volume}) = (Wf/\rho f)/\{Wf/\rho f + (Ws - Wf)/\rho r\} \times 100$$

$\rho f$: the density of the reinforced fibers (g/cm$^3$)
$\rho r$: the density of the resin (g/cm$^3$)

(2) Bending Test on Structure Material

Test pieces were cut out of the structure material, and the bending modulus of the entire structure material was measured in accordance with ISO 178 Method (1993). Furthermore, the first part and the second part were separated from each other using a cutter; bending modulus was measured in a similar manner for each of them. As to these test pieces, test pieces cut out in four directions including a 0° direction freely set and +45°, −45°, and 90° directions were prepared. The number of measurement n=5 was set for each of the directions, and its arithmetic mean was defined as a bending modulus Ec. As to a measurement apparatus, "INSTRON" (registered trademark) model 5565 universal material testing system (manufactured by INSTRON JAPAN Co., Ltd.) was used. From the obtained result, the specific bending modulus of the structure material was calculated by the following expression.

Specific bending modulus=$Ec^{1/3}/\rho$ (3) Oriented Angle θf of Reinforced Fibers of Structure Material A piece with a width of 25 mm was cut out of the structure material, was embedded in an epoxy resin and was polished so as to cause a perpendicular section in a sheet thickness direction to be a surface to be observed to prepare a sample. The sample was magnified 400 times with a laser microscope (VK-9510 manufactured by KEYENCE CORPORATION) to observe a fiber sectional shape. An observed image was developed onto multi-purpose image analysis software, an individual fiber section viewed in the observation image was extracted using a computer program incorporated in the software, an oval inscribed in the fiber section was provided, and the shape of the fiber section was approximated thereto (hereinafter, referred to as a fiber oval). Furthermore, for a fiber oval with an aspect ratio, which is represented by a major axial length α/a minor axial length β of the fiber oval, of 20 or more, an angle formed by the planar direction X and a major axial direction of the fiber oval was determined. The operation was repeated for samples to be observed extracted from different parts of the structure material, whereby oriented angles were measured for a total of 600 reinforced fibers, and their arithmetic mean was determined to be the oriented angle θf of the reinforced fibers.

(4) Specific Gravity ρ of Structure Material

A test piece was cut out of the structure material, and an apparent specific gravity of the structure material was measured with reference to JIS K7222 (2005). The dimensions of the test piece were 100 mm long and 100 mm wide. The length, width, and thickness of the test piece were measured with a micrometer, and a volume V of the test pieces was calculated from the obtained values. A mass M of the cut-out test piece was measured with an electronic balance. The obtained mass M and volume V were substituted into the following expression to calculate a specific gravity ρ of the structure material.

$\rho[g/cm^3]=10^3 \times M[g]/V[mm^3]$ (5) Volume Content of Voids of Structure Material A test piece of 10 mm long and 10 mm wide was cut out of the structure material, and a section was observed with a scanning electron microscope (SEM) (model S-4800 manufactured by Hitachi High-Technologies Corporation) to photograph ten sites at regular intervals from the surface of the structure material with a 1,000-fold magnification. For each image, an area $A_a$ of voids within the image was determined. Furthermore, the area $A_a$ of the voids was divided by the area of the entire image to calculate a porosity. The volume content of the voids of the structure material was determined by an arithmetic mean from the porosity at a total of 50 sites photographed at ten sites each for five test pieces.

(6) Thickness of Resin with which Reinforced Fibers are Coated

A test piece of 10 mm long and 10 mm wide was cut out of the structure material, and a section was observed with a scanning electron microscope (SEM) (model S-4800 manufactured by Hitachi High-Technologies Corporation) to photograph ten sites freely selected with a 3,000-fold magnification. From 50 sites freely selected in which sections of the reinforced fibers were cut in an obtained image, a coating thickness of the resin with which the reinforced fibers were coated was measured. For the thickness of the resin with which the reinforced fibers were coated, the arithmetic mean of the measurement results at the 50 sites was used.

[Carbon Fiber 1]

A copolymer with polyacrylonitrile as a main component was subjected to spun processing, calcined processing, and surface oxidation treatment processing to obtain a continuous carbon fiber with a total single yarn number of 12,000. The characteristics of this continuous carbon fiber were as follows.

Single filament diameter: 7 μm
Specific gravity: 1.8
Tensile strength: 4,600 MPa
Tensile modulus: 220 GPa

[PP Resin]

A resin sheet with a weight per unit area of 100 g/m² formed of 80% by mass of an unmodified polypropylene resin ("Prime Polypro" (registered trademark) J105G manufactured by PRIME POLYMER Co, Ltd.) and 20% by mass of an acid-modified polypropylene resin ("ADMER" QB510 manufactured by Mitsui Chemicals, Inc.) was prepared. Table 1 lists the characteristics of the obtained resin sheet.

[PA Resin]

A resin film with a weight per unit area of 124 g/m² formed of a nylon 6 resin ("AMILAN" (registered trademark) CM1021T manufactured by Toray Industries, Inc.) was prepared. Table 1 lists the characteristics of the obtained resin film.

[PC Resin]

A resin film with a weight per unit area of 132 g/m² formed of a polycarbonate resin ("lupilon" (registered trademark) H-4000 manufactured by Mitsubishi Engineering-Plastics Corporation) was prepared. Table 1 lists the characteristics of the obtained resin film.

[PPS Resin]

A resin nonwoven fabric with a weight per unit area of 147 g/m² formed of a polyphenylene sulfide resin ("TORELINA" (registered trademark) M2888 manufactured by Toray Industries, Inc.) was prepared. Table 1 lists the characteristics of the obtained resin nonwoven fabric.

[Epoxy Resin]

Blended were 40 parts by mass of "Epototo" YD128 (manufactured by Tohto Kasei Co., Ltd.), 20 parts by mass of "Epototo" YD128G (manufactured by Tohto Kasei Co., Ltd.), 20 parts by mass of "Epo Tohto" 1001 (manufactured by Japan Epoxy Resins Co., Ltd.), and 20 parts by mass of "Epo Tohto" 1009 (manufactured by Japan Epoxy Resins Co., Ltd.) as epoxy resins; 4 parts by mass of DICY 7 (dicyandiamide manufactured by Japan Epoxy Resins Co., Ltd.) and 3 parts by mass of DCMU 99 (3-(3,4-dichlorophenyl)-1,1-dimethylurea manufactured by HODOGAYA CHEMICAL CO., LTD.) as curing agents; and 5 parts by mass of "Vinylec" K (polyvinyl formal manufactured by CHISSO CORPORATION) as an additive. From this blend, a resin film with a weight per unit area of 132 g/m² was prepared using a knife coater. Table 1 lists the characteristics of the obtained resin film.

[Fiber-Reinforced Mat 3]

Carbon Fiber 1 was cut into 6 mm with a strand cutter to obtain chopped carbon fibers. A dispersion with a concentration of 0.1% by mass containing water and a surfactant (polyoxyethylene lauryl ether (product name) manufactured by nacalai tesque) was prepared. Using this dispersion and the chopped carbon fibers, a fiber-reinforced mat was manufactured using an apparatus for manufacturing a fiber-reinforced mat illustrated in FIG. 6. The manufacturing apparatus illustrated in FIG. 6 includes a cylindrical vessel with a diameter of 1,000 mm having an opening cock at the lower part of the vessel as a dispersing tank and a linear transportation unit (an inclination angle of 30°) connecting the dispersing tank and a paper-making tank. A stirrer is attached to an opening at the top face of the dispersing tank. The chopped carbon fibers and the dispersion (a dispersing medium) can be charged from the opening. The paper-making tank is a tank including a mesh conveyor having a paper-making face with a width of 500 mm on its bottom, and a conveyor that can convey a carbon fiber substrate (a paper-making substrate) is connected to the mesh conveyor. Paper making was performed with a carbon fiber concentration in the dispersion of 0.05% by mass. The carbon fiber substrate after paper making was dried for 30 minutes in a drying oven at 200° C. to obtain Fiber-Reinforced Mat 3. The obtained weight per unit area was 50 g/m$^2$. Table 2 lists the characteristics of the obtained Fiber-Reinforced Mat 3.

[Fiber-Reinforced Mat 5]

Carbon Fiber 1 was cut into 25 mm with a strand cutter to obtain chopped carbon fibers. The obtained chopped carbon fibers were caused to fall freely from a height of 80 cm to obtain Fiber-Reinforced Mat 5 in which the chopped carbon fibers were randomly distributed. Table 2 lists the characteristics of the obtained Fiber-Reinforced Mat 5.

First Reference Example

A laminate was prepared in which Fiber-Reinforced Mat 3 as a fiber-reinforced mat and the PP resin as a resin sheet were arranged in order of [resin sheet/fiber-reinforced mat/resin sheet/fiber-reinforced mat/resin sheet/fiber-reinforced mat/resin sheet/fiber-reinforced mat/fiber-reinforced mat/resin sheet/fiber-reinforced mat/resin sheet/fiber-reinforced mat/resin sheet/fiber-reinforced mat/resin sheet]. Subsequently, a structure material was obtained through the following processes (I) through (V). In the obtained structure material, voids with the reinforced fibers as columnar supports were found by sectional observation. Table 5 lists the characteristics of the obtained structure material.

(I) The laminate is arranged within a mold cavity for press molding preheated at 230° C., and the mold is closed.

(II) Subsequently, after being maintained for 120 seconds, the mold is maintained for additional 60 seconds with a pressure of 3 MPa applied.

(III) After Process (II), the mold cavity is opened, and a metallic spacer is inserted into the end thereof to perform adjustment to give a thickness of 3.4 mm when the structure material is obtained.

(IV) Subsequently, the mold cavity is again fastened, and the cavity temperature is decreased to 50° C. with the pressure maintained.

(V) The mold is opened, and the structure material is taken out of it.

Twenty-First Example

A laminate was obtained in a manner similar to the first reference example using a fiber-reinforced mat and a resin sheet similar to those of the first reference example. Subsequently, a structure material was obtained through the following processes (I) through (VI). In the obtained structure material, voids with the reinforced fibers as columnar supports were found by sectional observation. Table 5 lists the characteristics of the obtained structure material.

(I) The laminate is arranged within a mold cavity for press molding preheated at 230° C., and the mold is closed.

(II) Subsequently, after being maintained for 120 seconds, the mold is maintained for additional 60 seconds with a pressure of 3 MPa applied.

(III) After Process (II), the mold cavity was opened, and a spacer with a thickness of 1.2 mm was inserted into the end thereof, and the mold was maintained for 5 seconds.

(IV) Subsequently, adjustment is performed to give a thickness of 3.4 mm when the structure material is obtained.

(V) Subsequently, the mold cavity is again fastened, and the cavity temperature is decreased to 50° C. with the pressure maintained.

(VI) The mold is opened, and the structure material is taken out of it.

Twenty-Second Example

A laminate was obtained in a manner similar to the twenty-first example using a fiber-reinforced mat and a resin sheet similar to those of the first reference example. Subsequently, a structure material was obtained through the following processes (I) through (VI). In the obtained structure material, voids with the reinforced fibers as columnar supports were found by sectional observation. Table 5 lists the characteristics of the obtained structure material.

(I) The laminate is arranged within a mold cavity for press molding preheated at 230° C., and the mold is closed.

(II) Subsequently, after being maintained for 120 seconds, the mold is maintained for additional 60 seconds with a pressure of 3 MPa applied.

(III) After Process (II), the mold cavity was opened, and a metallic spacer with a thickness of 2.0 mm was inserted into the end thereof, and the mold was maintained for 20 seconds.

(IV) Subsequently, adjustment is performed to give a thickness of 3.4 mm when the structure material is obtained.

(V) Subsequently, the mold cavity is again fastened, and the cavity temperature is decreased to 50° C. with the pressure maintained.

(VI) The mold is opened, and the structure material is taken out of it.

Twenty-Third Example

A laminate was obtained in a manner similar to the twenty-first example using a fiber-reinforced mat and a resin sheet similar to those of the first reference example. Subsequently, a structure material was obtained through the following processes (I) through (VI). In the obtained structure material, voids with the reinforced fibers as columnar supports were found by sectional observation. Table 5 lists the characteristics of the obtained structure material.

(I) The laminate is arranged within a mold cavity for press molding preheated at 230° C., and the mold is closed.

(II) Subsequently, after being maintained for 120 seconds, the mold is maintained for additional 60 seconds with a pressure of 3 MPa applied.

(III) After Process (II), the mold cavity was opened, and metallic spacers with a thickness of 2.3 mm were inserted at regular intervals from the end to the center thereof, and the mold was maintained for 20 seconds.

(IV) Subsequently, the mold cavity is opened, and adjustment is performed to give a thickness of 3.4 mm of a part not being in contact with the metallic spacers at Process (III).

(V) Subsequently, the mold cavity is again fastened, and the cavity temperature is decreased to 50° C. with the pressure maintained.

(VI) The mold is opened, and the structure material is taken out of it.

Twenty-Fourth Example

A structure material was obtained in a manner similar to the twenty-first example except that the resin sheet was changed from the PP resin to the PA resin, that the preheating temperature at Process (I) was changed from 230° C. to 260° C., that the cavity temperature at Process (IV) was changed from 50° C. to 60° C., and that the thickness of the metallic spacer at Process (III) was changed. Table 5 lists the characteristics of the obtained structure material.

Twenty-Fifth Example

A structure material was obtained in a manner similar to the twenty-first example except that the resin sheet was changed from the PP resin to the PPS resin, that the preheating temperature at Process (I) was changed from 230° C. to 300° C., that the cavity temperature at Process (IV) was changed from 50° C. to 150° C., and that the thickness of the metallic spacer at Process (III) was changed. Table 5 lists the characteristics of the obtained structure material.

Twenty-Sixth Example

A structure material was obtained in a manner similar to the twenty-first example except that the resin sheet was changed from the PP resin to the PC resin, that the preheating temperature at Process (I) was changed from 230° C. to 300° C., and that the cavity temperature at Process (IV) was changed from 50° C. to 80° C. Table 5 lists the characteristics of the obtained structure material.

Twenty-Seventh Example

A laminate was obtained in a manner similar to the twenty-first example with the resin sheet changed from the PP resin to the epoxy resin. Subsequently, a structure material was obtained through the following processes (I) through (VI). In the obtained structure material, voids with the reinforced fibers as columnar supports were found by sectional observation. Table 5 lists the characteristics of the obtained structure material.

(I) The laminate is arranged within a mold cavity for press molding preheated at 150° C., and the mold is closed.

(II) Subsequently, the mold is maintained for additional 20 seconds with a pressure of 3 MPa applied.

(III) After Process (II), the mold cavity was opened, and a spacer with a thickness of 1.2 mm was inserted into the end thereof, and the mold was maintained for 5 seconds.

(IV) Subsequently, adjustment is performed to give a thickness of 3.4 mm when the structure material is obtained.

(V) Subsequently, the mold cavity is again fastened, and the cavity temperature is decreased to 50° C. with the pressure maintained.

(VI) The mold is opened, and the structure material is taken out of it.

Eleventh Comparative Example

A laminate was prepared in which Fiber-Reinforced Mat 3 as a fiber-reinforced mat and the PP resin as a resin sheet were arranged in order of [resin sheet/fiber-reinforced mat/resin sheet/fiber-reinforced mat/resin sheet/fiber-reinforced mat/resin sheet/fiber-reinforced mat/fiber-reinforced mat/resin sheet/fiber-reinforced mat/resin sheet/fiber-reinforced mat/resin sheet/fiber-reinforced mat/resin sheet/resin sheet/fiber-reinforced mat/resin sheet/fiber-reinforced mat/resin sheet/fiber-reinforced mat/resin sheet/fiber-reinforced mat/resin sheet/fiber-reinforced mat/resin sheet/fiber-reinforced mat/resin sheet/fiber-reinforced mat/resin sheet/fiber-reinforced mat/resin sheet/fiber-reinforced mat/resin sheet/fiber-reinforced mat/resin sheet/fiber-reinforced mat/resin sheet/fiber-reinforced mat/resin sheet]. Subsequently, a structure material was obtained in a manner similar to the twenty-first example except that the metallic spacer was not used at Process (III) in the twenty-first example. Table 6 lists the characteristics of the obtained structure material.

Twelfth Comparative Example

Seventy pieces of Fiber-Reinforced Mat 3 were stacked on one another, which was put between the PP resin to prepare a laminate. Subsequently, a structure material was obtained in a manner similar to the twenty-first example except that the thickness of the metallic spacer was changed from 3.4 mm to 3.2 mm at Process (III) in the twenty-first example. Table 6 lists the characteristics of the obtained structure material.

Thirteenth Comparative Example

A laminate was prepared in which Fiber-Reinforced Mat 5 as a fiber-reinforced mat and the PP resin as a resin sheet were arranged in order of [resin sheet/fiber-reinforced mat/fiber-reinforced mat/resin sheet]. Subsequently, a structure material was obtained in a manner similar to the twenty-first example except that the thickness of the metallic spacer was changed from 3.4 mm to 1.4 mm at Process (III) in the twenty-first example. Table 6 lists the characteristics of the obtained structure material.

Fourteenth Comparative Example

A laminate was prepared in which Fiber-Reinforced Mat 5 as a fiber-reinforced mat and the PP resin as a resin sheet were arranged in order of [resin sheet/fiber-reinforced mat/fiber-reinforced mat/resin sheet/fiber-reinforced mat/fiber-reinforced mat/resin sheet/resin sheet/fiber-reinforced mat/fiber-reinforced mat/resin sheet]. Subsequently, a structure material was obtained in a manner similar to the twenty-first example except that the structure material was obtained through the processes (I) through (VI) in the twenty-first example. Table 6 lists the characteristics of the obtained structure material.

Fifteenth Comparative Example

A structure material was obtained in a manner similar to the twenty-first example except that Fiber-Reinforced Mat 5 was used as a fiber-reinforced mat. Table 6 lists the characteristics of the obtained structure material.

Sixteenth Comparative Example

A structure material was obtained in a manner similar to the twenty-first example except that a molded body only through Process (I) and Process (III) in example 21 was taken out of the mold and was air-cooled. Table 6 lists the characteristics of the obtained structure material.

Seventeenth Comparative Example

A laminate was obtained in a manner similar to the twenty-first example using a fiber-reinforced mat and a resin sheet similar to those of the twenty-first example. Subsequently, a structure material was obtained through the following processes (I) through (VI). Table 6 lists the characteristics of the obtained structure material.

(I) The laminate is arranged within a mold cavity for press molding preheated at 230° C., and the mold is closed.

(II) Subsequently, after being maintained for 120 seconds, the mold is maintained for additional 60 seconds with a pressure of 3 MPa applied.

(III) After Process (II), the mold cavity was opened, and a spacer with a thickness of 1.8 mm was inserted into the end thereof, and the mold was maintained for 20 seconds.

(IV) Subsequently, adjustment is performed to give a thickness of 3.4 mm when the structure material is obtained.

(V) Subsequently, the mold cavity is again fastened, and the cavity temperature is decreased to 50° C. with the pressure maintained.

(VI) The mold is opened, and the structure material is taken out of it.

TABLE 5

| | | First Reference Example | Twenty-first Example | Twenty-second Example | Twenty-third Example | Twenty-fourth Example | Twenty-fifth Example | Twenty-sixth Example | Twenty-seventh Example |
|---|---|---|---|---|---|---|---|---|---|
| Structure material | Reinforced fibers | — | Fiber-Reinforced Mat 3 | Fiber-Reinforced Mat 3 | Fiber-Reinforced Mat 5 | Fiber-Reinforced Mat 5 | Fiber-Reinforced Mat 5 | Fiber-Reinforced Mat 3 | Fiber-Reinforced Mat 3 | Fiber-Reinforced Mat 3 |
| | Resin | — | PP resin | PP resin | PP resin | PP resin | PA resin | PPS resin | PC resin | Epoxy resin |
| Volume content of reinforced fibers | % by volume | 6.7 | — | — | — | — | — | — | — |
| Volume content of resin | % by volume | 26.6 | — | — | — | — | — | — | — |
| Volume content of voids | % by volume | 66.7 | — | — | — | — | — | — | — |
| Volume content of reinforced fibers of first part (surface) | % by volume | — | 20.0 | 20.0 | 20.0 | 20.0 | 20.0 | 20.0 | 20.0 |
| Volume content of resin of first part (surface) | % by volume | — | 80.0 | 80.0 | 80.0 | 80.0 | 80.0 | 80.0 | 80.0 |
| Porosity of first part (surface) | % by volume | — | 0 | 0 | 0 | 0 | 0 | 0 | 0 |
| Volume content of reinforced fibers of second part (center) | % by volume | — | 3.3 | 6.7 | 6.7 | 6.7 | 6.7 | 6.4 | 6.4 |
| Volume content of resin of second part (center) | % by volume | — | 13.4 | 26.6 | 26.6 | 26.6 | 26.6 | 26.9 | 29 |
| Porosity of second part (center) | % by volume | — | 83.3 | 66.7 | 66.7 | 66.7 | 66.7 | 66.7 | 66.7 |
| Specific gravity of entire structure material | g/cm³ | 0.36 | 0.36 | 0.50 | 0.50 | 0.50 | 0.71 | 0.65 | 0.65 |
| Specific gravity of first part (surface) of structure material | g/cm³ | — | 1.08 | 1.08 | 1.08 | 1.27 | 1.44 | 1.32 | 1.32 |
| Specific gravity of second part (center) of structure material | g/cm³ | — | 0.18 | 0.36 | 0.36 | 0.42 | 0.48 | 0.44 | 0.44 |
| Thickness of structure material (St) | mm | 3.4 | 3.4 | 3.4 | 3.4 | 3.4 | 3.4 | 3.4 | 3.4 |
| Length of reinforced fibers (Lf) | mm | 6 | 6 | 6 | 6 | 6 | 6 | 6 | 6 |
| Oriented angle in sectional direction of structure material (θf) | ° | 4.01 | — | — | — | — | — | — | — |
| Oriented angle of first part of structure material | ° | — | 1.34 | 2.04 | 2.04 | 2.04 | 2.04 | 2.04 | 2.04 |
| Oriented angle of second part of structure material | ° | — | 20.01 | 4.01 | 4.01 | 4.01 | 4.01 | 4.01 | 4.01 |
| Lf² · (1 − cos(θf)) | — | 0.09 | 0.36 | 0.09 | 0.09 | 0.10 | 0.10 | 0.10 | 0.10 |
| Resin coating around reinforced fibers | Present or absent | Present | Present | Present | Present | Present | Present | Present | Present |
| Resin thickness around reinforced fibers | μm | 4.8 | 4.8 | 4.8 | 4.8 | 4.8 | 4.6 | 5.2 | 5.2 |
| Bending modulus (Ec) | GPa | 8.1 | 8.1 | 8.7 | — | 9.7 | 10.0 | 9.0 | 10.2 |
| Specific bending modulus | — | 5.58 | 5.58 | 4.11 | — | 4.27 | 3.03 | 3.20 | 3.34 |
| Specific bending modulus of first part | — | — | 2.90 | 2.90 | 2.90 | 2.60 | 2.50 | 2.40 | 2.50 |
| Specific bending modulus of second part | — | — | 8.82 | 5.58 | 5.58 | 5.58 | 5.58 | 5.58 | 4.81 |

TABLE 6

|  |  | Eleventh Comparative Example | Twelfth Comparative Example | Thirteenth Comparative Example | Fourteenth Comparative Example | Fifteenth Comparative Example | Sixteenth Comparative Example | Seventeenth Comparative Example |
|---|---|---|---|---|---|---|---|---|
| Structure material | Reinforced fibers | — | Fiber-Reinforced Mat 3 | Fiber-Reinforced Mat 3 | Fiber-Reinforced Mat 5 | Fiber-Reinforced Mat 5 | Fiber-Reinforced Mat 3 | Fiber-Reinforced Mat 3 |
|  | Resin | — | PP resin | PP resin | PP resin | PP resin | PP resin | PP resin |
| Volume content of reinforced fibers | % by volume | 20 | 60 | 3.3 | 3.3 | 6.7 | 6.7 | 6.7 |
| Volume content of resin | % by volume | 80 | 6.7 | 13.4 | 13.4 | 26.6 | 26.6 | 26.6 |
| Volume content of voids | % by volume | 0 | 33.3 | 83.3 | 83.3 | 66.7 | 66.7 | 66.7 |
| Porosity of first part (surface) of structure material | % by volume | 0 | 33.3 | 83.3 | 83.3 | 66.7 | 66.7 | 33.3 |
| Porosity of second part (center) of structure material | % by volume | 0 | 33.3 | 83.3 | 83.3 | 66.7 | 66.7 | 83.3 |
| Specific gravity of entire structure material | g/cm$^3$ | 1.08 | 1.14 | 0.18 | 0.18 | 0.42 | 0.36 | 0.36 |
| Specific gravity of first part (surface) of structure material | g/cm$^3$ | 1.08 | 1.14 | 0.18 | 0.18 | 0.42 | 0.36 | 0.72 |
| Specific gravity of second part (center) of structure material | g/cm$^3$ | 1.08 | 1.14 | 0.18 | 0.18 | 0.42 | 0.36 | 0.18 |
| Thickness of structure material (St) | mm | 2.8 | 3.2 | 1.4 | 3.4 | 3.4 | 3.4 | 3.4 |
| Length of reinforced fibers (Lf) | mm | 6 | 6 | 25 | 25 | 25 | 6 | 6 |
| Oriented angle in sectional direction of structure material ($\theta f$) | ° | 1.34 | 0.65 | 8.04 | 8.04 | 55.6 | 4.01 | 2.04 |
| Oriented angle of first part of structure material | ° | 1.34 | 0.65 | 8.04 | 8.04 | 55.6 | 4.01 | 2.04 |
| Oriented angle of second part of structure material | ° | 1.34 | 0.65 | 8.04 | 8.04 | 55.6 | 4.01 | 8.04 |
| $Lf^2 \cdot (1 - \cos(\theta f))$ | — | 0.01 | 0.00 | 6.14 | 6.14 | 271.9 | 0.09 | 0.02 |
| Resin coating around reinforced fibers | Present or absent | Present | Complete impregnation | Absent | Partially present | Partially present | Partially present | Absent | Partially present |
| Resin thickness around reinforced fibers (only partially) | μm | — | Unmeasurable | 0.5 to 30 with uneven density | 0.5 to 30 with uneven density | 20 | Adherence only to intersections of reinforced fibers | 0.5 to 30 with uneven density |
| Bending modulus (Ec) | GPa | 14.0 | 0.2 | 1.2 | 1.2 | 2.5 | 1.0 | 2.5 |
| Specific bending modulus |  | 2.23 | 0.51 | 5.90 | 5.90 | 3.23 | 2.78 | 3.23 |
| Specific bending modulus of first part |  | — | — | — | — | — | — | 2.80 |
| Specific bending modulus of second part |  | — | — | — | — | — | — | 4.04 |

[Consideration]

It is clear that the present example is excellent in a balance between the specific bending modulus and the absolute value of the bending modulus owing to the fact that the thickness St of the structure material satisfies the conditional expression $St \geq Lf^2 \cdot (1-\cos(\theta f))$. Furthermore, the same holds true for the twenty-fourth, the twenty-fifth, and the twenty-sixth examples, in which the resin type was changed. In contrast, in the eleventh comparative example, in which the fiber-reinforced mat and the resin were similar to those of the twenty-first example, owing to the absence of voids, the specific bending modulus was unable to be satisfied. In the twelfth comparative example, in which the volume ratios of the resin and the voids were adjusted, a balance between them and the volume ratio of the fiber-reinforced mat was poor, and the bending modulus was low. It is estimated that this is because coating by the resin around the reinforced fibers was not formed. In the thirteenth comparative example, the bending modulus was low. This is because the reinforced fibers not in a nearly monofilament form were used, which was not improved by the fourteenth comparative example, in which the thickness of the structure material was changed. In the fifteenth comparative example, the fiber length of the reinforced fibers was increased, and the conditional expression $St \geq Lf^2 \cdot (1-\cos(\theta f))$ was unable to be satisfied. Consequently, the absolute value of the bending modulus was unable to be satisfied. In the sixteenth comparative example, the reinforced fibers were not coated with the resin, and the resin was localized at intersection points of the reinforced fibers, whereby the absolute value of the bending modulus was low, although the contents of the reinforced fibers, the resin, and the voids were satisfied; as a result, the value of the specific bending modulus was unable to be satisfied. In the seventeenth comparative example, high-specific gravity regions were provided on the surfaces, whereas a low specific gravity region was provided at the central part; their thickness ratio was 1:1 between both surfaces and the center. The bending properties of the seventeenth comparative example were evaluated; owing to a bad balance in thickness ratio between the regions having voids on the surfaces and the region having voids at the center of the structure material, the properties of the layer having a high porosity at the central part were predominant, which made unable to obtain a desired property.

INDUSTRIAL APPLICABILITY

The present invention can provide a structure material excellent in stiffness and lightness. In addition, the present invention can provide a structure material excellent in lightness and mechanical characteristics.

REFERENCE SIGNS LIST

1 Structure material
2 Resin
3 Reinforced fiber
4 Void

The invention claimed is:

1. A structure material comprising a resin, reinforced fibers, and voids,
  a volume content of the resin being within a range of 2.5% by volume or more and 85% by volume or less,
  a volume content of the reinforced fibers being within a range of 0.5% by volume or more and 55% by volume or less,
  the voids being contained in the structure material in a rate within a range of 10% by volume or more and 97% by volume or less,
  a thickness St (mm) of the structure material satisfying a conditional expression:

$$St \geq Lf^2 \cdot (1-\cos(\theta f))$$

wherein
  a length of the reinforced fibers is Lf (mm),
  an oriented angle θf (degrees) in the conditional expression is an arithmetic mean of oriented angles measured for reinforced fibers in a sectional direction of the structure material,
  the oriented angle θf is 3° or more and 60° or less, and
  a specific bending modulus of the structure material represented as $Ec^{1/3} \cdot \rho^{-1}$ is within a range of 3 or more and 20 or less, wherein Ec is the structure material bending modulus that is 3 GPa or more and ρ is the structure material specific gravity.

2. The structure material according to claim 1, wherein the bending modulus Ec of the structure material is 6 GPa or more.

3. The structure material according to claim 1, wherein the specific gravity ρ of the structure material is 0.9 g/cm³ or less.

4. The structure material according to claim 1, wherein a porosity of a first portion within 30% to a midpoint position in a thickness direction from surfaces of the structure material is within a range of 0% by volume or more and less than 10% by volume, and a porosity of a second remaining portion is within a range of 10% by volume or more and 97% by volume or less.

5. The structure material according to claim 1, wherein the reinforced fibers are coated with the resin, and a thickness of the resin is within a range of 1 μm or more and 15 μm or less.

6. The structure material according to claim 1, wherein the reinforced fibers are discontinuous and are dispersed in a nearly monofilament form and in a random manner.

7. The structure material according to claim 1, wherein a longer of the mass mean fiber length of the reinforced fibers is within a range of 1 mm or more and 15 mm or less.

8. The structure material according to claim 1, wherein the reinforced fibers are carbon fibers.

9. The structure material according to claim 1, wherein the resin contains at least one thermoplastic resin.

10. The structure material according to claim 1, wherein the resin contains at least one thermosetting resin.

11. A structure material comprising a resin, reinforced fibers, and voids,
  a volume content of the resin being within a range of 2.5% by volume or more and 85% by volume or less,
  a volume content of the reinforced fibers being within a range of 0.5% by volume or more and 55% by volume or less,
  the voids being contained in the structure material in a rate within a range of 10% by volume or more and 97% by volume or less,
  a thickness St (mm) of the structure material satisfying a conditional expression:

$$St \geq Lf^2 \cdot (1-\cos(\theta f°))$$

wherein
  a length of the reinforced fibers is Lf (mm),
  an oriented angle θf in the conditional expression is an arithmetic mean of oriented angles measured for reinforced fibers in a sectional direction of the structure material,
  the oriented angle θf is 3° or more and 60° or less,
  a specific bending modulus of a first part of the structure material represented as $Ec^{1/3} \cdot \rho^{-1}$ is within a range of 1 or more and less than 3, wherein Ec is the structure material bending modulus that is 3 GPa or more and ρ is the structure material specific gravity, and
  a specific bending modulus of a second part of the structure material different from the first part is within a range of 3 or more and 20 or less.

12. The structure material according to claim 11, wherein the bending modulus Ec of the second part of the structure material is 6 GPa or more.

13. The structure material according to claim 11, wherein the first part and the second part of the structure material are present at different positions in a thickness direction of the structure material.

14. The structure material according to claim 11, wherein the first part and the second part of the structure material are present at different positions in a planar direction of the structure material.

* * * * *